US007900240B2

(12) United States Patent
Terzis et al.

(10) Patent No.: US 7,900,240 B2
(45) Date of Patent: Mar. 1, 2011

(54) MULTILAYER ACCESS CONTROL SECURITY SYSTEM

(75) Inventors: Andreas Terzis, Owings Mills, MD (US); Marco A. Murgia, Los Gatos, CA (US); Ashwin Baskaran, Petaluma, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1082 days.

(21) Appl. No.: 10/857,224

(22) Filed: May 28, 2004

(65) Prior Publication Data

US 2004/0243835 A1 Dec. 2, 2004

Related U.S. Application Data

(60) Provisional application No. 60/473,961, filed on May 28, 2003.

(51) Int. Cl.
*H04L 9/00* (2006.01)

(52) U.S. Cl. ....................... 726/2; 726/1; 726/3; 726/4; 726/11; 709/225; 709/227; 709/229; 370/392; 370/401

(58) Field of Classification Search ..................... 726/1, 726/2, 3, 11, 26, 4, 27, 14, 12, 28; 713/150, 713/165; 709/225, 229, 227; 370/392, 401
See application file for complete search history.

(56) References Cited

U.S. PATENT DOCUMENTS

| | | | | |
|---|---|---|---|---|
| 5,550,981 | A | 8/1996 | Bauer et al. | |
| 5,606,668 | A | 2/1997 | Shwed et al. | |
| 5,835,726 | A | 11/1998 | Shwed et al. | |
| 5,905,492 | A | 5/1999 | Straub et al. | |
| 5,968,176 | A * | 10/1999 | Nessett et al. | 726/11 |

(Continued)

FOREIGN PATENT DOCUMENTS

| | | |
|---|---|---|
| EP | 575765 | 12/1993 |

(Continued)

OTHER PUBLICATIONS

Authenticated VLANs Secure Network Access at Layer 2, ALCATEL white paper, pp. 1-14, 2002.*

(Continued)

*Primary Examiner*—Nasser Moazzami
*Assistant Examiner*—Shanto M Abedin
(74) *Attorney, Agent, or Firm*—Foley and Lardner LLP; Christopher McKenna

(57) ABSTRACT

A computer-based system provides secure, configurable access to computer network resources. A human-readable language is provided for defining access policy rules. Rules in this language are converted in an automated fashion into filters applied within the various subsystems and components in a multi-layer security system. Network users are authenticated by an access control security system that obtains basic information about that user. Based on the user ID, a set of abstract policies can be retrieved. The retrieved policies are associated with the user and the groups associated with that user. Based on the retrieved rules, a set of rules for multiple layers of the network are generated and applied to those subsystems. Two or more of the subsystems may be placed in series with different types of processing occurring in each of the subsystems, reducing the workload of subsequent subsystems.

27 Claims, 18 Drawing Sheets

U.S. PATENT DOCUMENTS

| | | | | |
|---|---|---|---|---|
| 5,987,611 | A | 11/1999 | Freund | |
| 6,026,440 | A | 2/2000 | Shrader et al. | |
| 6,058,431 | A | 5/2000 | Srisuresh et al. | |
| 6,088,451 | A | 7/2000 | He et al. | |
| 6,161,139 | A | 12/2000 | Win et al. | |
| 6,182,142 | B1 | 1/2001 | Win et al. | |
| 6,199,753 | B1 | 3/2001 | Tracy et al. | |
| 6,219,786 | B1 * | 4/2001 | Cunningham et al. | 713/152 |
| 6,272,632 | B1 | 8/2001 | Carman et al. | |
| 6,321,336 | B1 | 11/2001 | Applegate et al. | |
| 6,321,337 | B1 | 11/2001 | Reshef et al. | |
| 6,345,239 | B1 | 2/2002 | Bowman-Amuah | |
| 6,378,110 | B1 * | 4/2002 | Ho | 716/5 |
| 6,393,474 | B1 * | 5/2002 | Eichert et al. | 709/223 |
| 6,400,996 | B1 | 6/2002 | Hoffberg et al. | |
| 6,412,000 | B1 * | 6/2002 | Riddle et al. | 709/224 |
| 6,415,329 | B1 | 7/2002 | Gelman et al. | |
| 6,427,132 | B1 | 7/2002 | Bowman-Amuah | |
| 6,452,915 | B1 | 9/2002 | Jorgensen | |
| 6,463,474 | B1 | 10/2002 | Fuh et al. | |
| 6,473,794 | B1 | 10/2002 | Guheen et al. | |
| 6,484,206 | B2 | 11/2002 | Crump et al. | |
| 6,496,935 | B1 | 12/2002 | Fink et al. | |
| 6,499,107 | B1 | 12/2002 | Gleichauf et al. | |
| 6,499,110 | B1 * | 12/2002 | Moses et al. | 726/1 |
| 6,519,571 | B1 | 2/2003 | Guheen et al. | |
| 6,536,037 | B1 | 3/2003 | Guheen et al. | |
| 6,550,012 | B1 | 4/2003 | Villa et al. | |
| 6,594,692 | B1 | 7/2003 | Reisman | |
| 6,606,744 | B1 | 8/2003 | Mikurak | |
| 6,609,154 | B1 | 8/2003 | Fuh et al. | |
| 6,611,862 | B2 | 8/2003 | Reisman | |
| 6,611,867 | B1 | 8/2003 | Bowman-Amuah | |
| 6,615,166 | B1 | 9/2003 | Guheen et al. | |
| 6,615,357 | B1 * | 9/2003 | Boden et al. | 726/15 |
| 6,640,145 | B2 | 10/2003 | Hoffberg et al. | |
| 6,640,248 | B1 | 10/2003 | Jorgensen | |
| 6,658,464 | B2 | 12/2003 | Reisman | |
| 6,671,818 | B1 | 12/2003 | Mikurak | |
| 6,701,432 | B1 | 3/2004 | Deng et al. | |
| 6,721,713 | B1 | 4/2004 | Guheen et al. | |
| 6,728,716 | B1 * | 4/2004 | Bhattacharya et al. | 707/10 |
| 6,772,347 | B1 | 8/2004 | Xie et al. | |
| 6,789,252 | B1 | 9/2004 | Burke et al. | |
| 6,792,461 | B1 | 9/2004 | Hericourt | |
| 6,850,252 | B1 | 2/2005 | Hoffberg | |
| 6,850,943 | B2 | 2/2005 | Teixeira et al. | |
| 6,873,988 | B2 | 3/2005 | Herrmann et al. | |
| 6,880,005 | B1 * | 4/2005 | Bell et al. | 709/225 |
| 6,904,449 | B1 | 6/2005 | Quinones | |
| 6,918,113 | B2 | 7/2005 | Patel et al. | |
| 6,931,411 | B1 * | 8/2005 | Babiskin et al. | 707/100 |
| 6,950,818 | B2 | 9/2005 | Dennis et al. | |
| 6,954,736 | B2 | 10/2005 | Menninger et al. | |
| 6,957,186 | B1 | 10/2005 | Guheen et al. | |
| 6,959,298 | B1 | 10/2005 | Silverbrook et al. | |
| 6,959,320 | B2 | 10/2005 | Shah et al. | |
| 6,980,962 | B1 | 12/2005 | Arganbright et al. | |
| 6,985,922 | B1 | 1/2006 | Bashen et al. | |
| 7,000,012 | B2 | 2/2006 | Moore et al. | |
| 7,006,881 | B1 | 2/2006 | Hoffberg et al. | |
| 7,006,993 | B1 | 2/2006 | Cheong et al. | |
| 7,028,305 | B2 | 4/2006 | Schaefer | |
| 7,039,606 | B2 | 5/2006 | Hoffman et al. | |
| 7,043,524 | B2 | 5/2006 | Shah et al. | |
| 7,054,837 | B2 | 5/2006 | Hoffman et al. | |
| 7,054,944 | B2 * | 5/2006 | Tang et al. | 709/229 |
| 7,069,437 | B2 * | 6/2006 | Williams | 713/166 |
| 7,072,843 | B2 | 7/2006 | Menninger et al. | |
| 7,089,583 | B2 | 8/2006 | Mehra et al. | |
| 7,093,280 | B2 * | 8/2006 | Ke et al. | 726/3 |
| 7,103,772 | B2 | 9/2006 | Jorgensen et al. | |
| 7,120,596 | B2 | 10/2006 | Hoffman et al. | |
| 7,124,101 | B1 | 10/2006 | Mikurak | |
| 7,127,713 | B2 | 10/2006 | Davis et al. | |
| 7,130,807 | B1 | 10/2006 | Mikurak | |
| 7,143,288 | B2 | 11/2006 | Pham et al. | |
| 7,149,698 | B2 | 12/2006 | Guheen et al. | |
| 7,155,518 | B2 | 12/2006 | Forslow | |
| 7,159,125 | B2 * | 1/2007 | Beadles et al. | 713/193 |
| 7,165,041 | B1 | 1/2007 | Guheen et al. | |
| 7,171,379 | B2 | 1/2007 | Menninger et al. | |
| 7,216,149 | B1 | 5/2007 | Briscoe et al. | |
| 7,231,657 | B2 | 6/2007 | Honarvar et al. | |
| 7,302,700 | B2 * | 11/2007 | Mao et al. | 726/11 |
| 7,308,711 | B2 * | 12/2007 | Swander et al. | 726/13 |
| 7,310,721 | B2 | 12/2007 | Cohen | |
| 7,313,822 | B2 | 12/2007 | Ben-Itzhak et al. | |
| 7,346,921 | B2 * | 3/2008 | Murren et al. | 726/1 |
| 7,350,226 | B2 * | 3/2008 | Moriconi et al. | 726/1 |
| 7,376,969 | B1 * | 5/2008 | Njemanze et al. | 726/22 |
| 7,415,723 | B2 * | 8/2008 | Pandya | 726/13 |
| 7,509,673 | B2 * | 3/2009 | Swander et al. | 726/11 |
| 7,536,548 | B1 * | 5/2009 | Batke et al. | 713/166 |
| 7,587,751 | B2 | 9/2009 | Potter et al. | |
| 2002/0029340 | A1 | 3/2002 | Pensak et al. | |
| 2002/0032798 | A1 | 3/2002 | Xu | |
| 2002/0049608 | A1 | 4/2002 | Hartsell et al. | |
| 2002/0049841 | A1 | 4/2002 | Johnson et al. | |
| 2002/0059274 | A1 | 5/2002 | Hartsell et al. | |
| 2002/0059425 | A1 | 5/2002 | Belfiore et al. | |
| 2002/0065864 | A1 | 5/2002 | Hartsell et al. | |
| 2002/0083183 | A1 | 6/2002 | Pujare et al. | |
| 2002/0087883 | A1 | 7/2002 | Wohlgemuth et al. | |
| 2002/0091701 | A1 | 7/2002 | Wall et al. | |
| 2002/0091763 | A1 | 7/2002 | Shah et al. | |
| 2002/0107990 | A1 | 8/2002 | Johnson et al. | |
| 2002/0108059 | A1 | 8/2002 | Canion et al. | |
| 2002/0116582 | A1 | 8/2002 | Copeland et al. | |
| 2002/0129271 | A1 * | 9/2002 | Stanaway et al. | 713/201 |
| 2002/0157023 | A1 | 10/2002 | Callahan et al. | |
| 2002/0161908 | A1 | 10/2002 | Benitez et al. | |
| 2002/0174215 | A1 | 11/2002 | Schaefer | |
| 2002/0174227 | A1 | 11/2002 | Hartsell et al. | |
| 2003/0004882 | A1 | 1/2003 | Holler et al. | |
| 2003/0009538 | A1 | 1/2003 | Shah et al. | |
| 2003/0023873 | A1 | 1/2003 | Ben-Itzhak | |
| 2003/0046586 | A1 | 3/2003 | Bheemarasetti et al. | |
| 2003/0046587 | A1 | 3/2003 | Bheemarasetti et al. | |
| 2003/0055962 | A1 | 3/2003 | Freund et al. | |
| 2003/0065942 | A1 * | 4/2003 | Lineman et al. | 713/201 |
| 2003/0067874 | A1 | 4/2003 | See et al. | |
| 2003/0084165 | A1 | 5/2003 | Kjellberg et al. | |
| 2003/0088788 | A1 | 5/2003 | Yang | |
| 2003/0154239 | A1 | 8/2003 | Davis et al. | |
| 2003/0177389 | A1 | 9/2003 | Albert et al. | |
| 2003/0182431 | A1 | 9/2003 | Sturniolo et al. | |
| 2003/0188001 | A1 | 10/2003 | Eisenberg et al. | |
| 2003/0191812 | A1 | 10/2003 | Agarwalla et al. | |
| 2003/0191971 | A1 | 10/2003 | Klensin et al. | |
| 2004/0031058 | A1 | 2/2004 | Reisman | |
| 2004/0059943 | A1 * | 3/2004 | Marquet et al. | 713/201 |
| 2004/0073630 | A1 | 4/2004 | Copeland et al. | |
| 2004/0078591 | A1 | 4/2004 | Teixeira et al. | |
| 2004/0087304 | A1 | 5/2004 | Buddhikot et al. | |
| 2004/0107342 | A1 | 6/2004 | Pham et al. | |
| 2004/0107360 | A1 | 6/2004 | Herrmann et al. | |
| 2004/0111461 | A1 * | 6/2004 | Claudatos et al. | 709/200 |
| 2004/0131042 | A1 | 7/2004 | Lillie et al. | |
| 2004/0181476 | A1 | 9/2004 | Smith et al. | |
| 2004/0249975 | A1 | 12/2004 | Tuck et al. | |
| 2004/0255154 | A1 | 12/2004 | Kwan et al. | |
| 2004/0268361 | A1 | 12/2004 | Schaefer | |
| 2005/0013298 | A1 * | 1/2005 | Srisuresh et al. | 370/392 |

| | | | | |
|---|---|---|---|---|
| 2005/0015624 | A1 | 1/2005 | Ginter et al. | |
| 2005/0025125 | A1 | 2/2005 | Kwan | |
| 2005/0055570 | A1 | 3/2005 | Kwan et al. | |
| 2005/0097298 | A1 | 5/2005 | Cohen | |
| 2005/0204050 | A1 * | 9/2005 | Turley et al. | 709/229 |
| 2005/0251856 | A1 | 11/2005 | Araujo et al. | |
| 2005/0262357 | A1 | 11/2005 | Araujo et al. | |
| 2005/0273849 | A1 | 12/2005 | Araujo et al. | |
| 2006/0036570 | A1 | 2/2006 | Schaefer et al. | |
| 2006/0069926 | A1 | 3/2006 | Ginter et al. | |
| 2006/0092861 | A1 | 5/2006 | Corday et al. | |
| 2007/0179955 | A1 | 8/2007 | Croft et al. | |
| 2007/0245409 | A1 | 10/2007 | Harris et al. | |
| 2007/0297378 | A1 | 12/2007 | Poyhonen et al. | |

FOREIGN PATENT DOCUMENTS

| | | | |
|---|---|---|---|
| JP | 2004/533054 | | 5/2001 |
| KR | 199968380 | | 9/2000 |
| KR | 2000057127 | | 9/2000 |
| KR | 19990003481 | | 9/2000 |
| WO | WO-9718635 | | 5/1997 |
| WO | WO-03096647 | A1 | 11/2003 |
| WO | WO-2004/003879 | | 1/2004 |
| WO | WO-200524567 | A2 | 3/2005 |
| WO | WO-2006012533 | | 2/2006 |
| WO | WO-2006017388 | | 2/2006 |
| WO | WO-2008051842 | A2 | 5/2008 |

OTHER PUBLICATIONS

International Search Report for PCT/US04/17011, mailing date Jun. 22, 2005. 2 pages.

Written Opinion for PCT/US04/01711, mailed on Jun. 22, 2005.

International Preliminary Report on Patentability for PCT/US04/017011, mailed on Dec. 1, 2005.

Ilumenn Nessett, "The Multilayer Firewall", XP002559215, Mar. 1998.

Supplemental European Search Report for European App. EP04753768, Issued Dec. 7, 2009.

* cited by examiner

| Caymas Resource Manager | | | |
|---|---|---|---|
| Resources | Share? | With Whom? | When? |
| HTTP://extranet.agilent.com/nokia/marketing/* | ○ | | |
| CIFS://fileshare1.agilent.com/nokia/schedules/* | ○ | | |
| HTTPS://orderinfo.crm.agilent.com/ | ◉ | Joe_Erikson@nokia.com    Edit | July 01 2002- Dec 01 2002    Edit |
| HTTPS://extranet.agilent.com/nokia/status | ○ | | |

510 — (header)
520 — Share?
530 — With Whom?
540 — When?
500 — (window)

| PROTOCOL NAME | DIRECTION | FILTER | EXECUTE | |
|---|---|---|---|---|
| HTTP | INCOMING REQUEST | URL= Http://extranet.agilent.com/nokia/marketing/* | Allow for user ID 123 | 910 |
| TCP | INCOMING REQUEST | DST IP: 1.2.3.4<br>DST PORT: 443 | Allow | 920 |
| HTTP | INCOMING RESPONSE | URL= Content = "<ahref=http://extranet.agilent.com/nokia/marketing/* | Change content to "<ahref=https://extranet.agilent.com/nokia/marketing/$origfile"<br>Sign user cookies<br>Sign URLs | 930 |

*FIG. 9*

MULTILAYER ACCESS CONTROL SECURITY SYSTEM

CROSS-REFERENCE TO RELATED APPLICATIONS

This patent application claims priority to the provisional patent application entitled, "Multilayer Access Control Security System" filed on May 28, 2003, Ser. No. 60/473,961 which is incorporated by reference herein. This patent application incorporates by reference in its entirety each of the following co-pending U.S. patent applications: 1) "Method and System for Identifying Bidirectional Packet Flow" filed on May 28, 2004; 2) "Policy Based Network Address Translation" filed on May 28, 2004; and 3) "Method, System and Software for System Signing of Internet Resources" filed on May 28, 2004.

BACKGROUND OF THE INVENTION

Computer networks form the information backbone of most businesses today, carrying extensive amounts of data including application data, stored data, e-mail, multimedia, and applications themselves Access to those networks is essential for the operation of most businesses, since communications regarding products and services and transactions in which those products and services are sold are frequently conducted over the network. Modern computer networks in a corporation are accessed not only by employees, but also by customers, partners, and in many cases by the general public.

Because these networks are almost always connected to the Internet, they are subject to attack by hackers or other individuals seeking to illicitly gain access to confidential information. Hackers or other individuals may attempt to gain access to sensitive data, or they may attempt to alter or corrupt part of the network in an effort to either steal valuable information or harm the corporation. Some of the techniques a hacker may use include, but are not limited to, password sniffing, buffer overflows, port scans, denial-of-service attacks, Trojans, or viruses.

One technique currently used to protect corporate networks is the use of different types of protection devices and software applications that operate at different levels or layers within the network. The different layers of the network are frequently modeled according to the International Organization for Standardization (ISO) model for computer networking, called the Open Systems Interconnect (OSI) Reference Model, and the Institute of Electrical and Electronic Engineers (IEEE) 802 model. The ISO OSI and IEEE 802 models define a modular approach to networking, with each layer responsible for some discrete aspect of the networking process. By placing separate security systems at multiple levels or layers within the network it is possible to provide more than one level of protection, although having separate security systems can be expensive and inefficient.

The OSI model describes the flow of data in a network, from the flow of information over the actual physical connections up to the layer containing the user's applications. Each layer is able to communicate with the layers above it and below it, but it conceptually communicates with the corresponding layer on another system. Layers are segregated in that one layer does not need to have knowledge of another layer, but simply deals with the transport of information within that layer according to the functionality of that layer. The TCP/IP model differs somewhat from the OSI model, but it follows the same general layered design concept.

FIG. 1 illustrates an exemplary flow of communications between a sending process 110 and a receiving process 120. Communications between the processes (devices) are performed at various different layers. As illustrated, the layers of communication include an application layer 130, a presentation layer 140, a session layer 150, a transport layer 160, a network layer 170, a data link layer 180 and a physical layer 190. An overview of the layers, from the highest layer on down, is as follows:

The application layer (e.g., layer 7) 130 is the level at which applications access network services. It represents the interface for programs such as e-mail, viewing of web pages, access to databases, and other types of services typically provided by networked computers.

The presentation layer (e.g., layer 6) 140 translates data from the application layer into an intermediary format. It can compress data as necessary for transport, or provide data encryption when required.

The session layer (e.g., layer 5) 150 establishes dialog between two computers in a session, allows two applications on different computers to establish, use, and end the session, and regulates which side transmits, when and for how long.

The transport layer (e.g., layer 4) 160 handles error recognition and recovery, and it can repackage long messages when necessary into small packets for transmission. At the receiving end, the transport layer rebuilds packets into the original message, and also sends receipt acknowledgments.

The network layer (e.g., layer 3)170 addresses messages and translates logical addresses and names into physical addresses such as IP addresses. The network layer also controls switching and routing and manages traffic so as to avoid problems with congestion of data packets.

The data link layer (e.g. layer 2) 180 packages raw bits from a physical layer into frames. These frames represent logical, structured packets for data. The data link layer ensures that data is effectively transferred from computer-to-computer without errors. The data link layer awaits acknowledgement of the receipt of a frame from the receiving computer, and in some circumstances it will retransmit a frame if necessary.

The physical layer (e.g. layer 1) 190 is responsible for the transmission of the individual bits over a particular physical medium (e.g., twisted wire pair cable, wireless connection, fiber optic cable), and it regulates the transmission of that stream of bits over the physical medium. This layer encompasses the connection of the computer to the network interface, and the format for the transmission of the signals over that particular physical medium.

Although various types of equipment and software exist to protect a network by analyzing data at a particular layer, these units do not act in conjunction with one another. This results in inefficiencies in operation, as well as in installation and setup. Each piece of equipment or software must be set up and programmed independently. Traffic flows through each of the protection systems are not coordinated, resulting in inefficiencies in processing and an inability to effectively manage high volumes of traffic.

Programming of equipment can be particularly tedious, since each piece must be programmed according to the particulars of that manufacturer and with respect to the functionality of that layer. Network administrators must be knowledgeable of a vast array of systems and techniques, and constantly monitor multiple systems, if they are to ensure protection of network resources. As well-publicized breaches of network security have made clear, this is a nearly impossible task with current tools.

Furthermore, many systems, including some firewalls and server operating systems, provide broad access to resources by default, and require explicit configuration to protect resources. Insertion of many current systems into a network can actually reduce network security until they are properly configured. Networks, and the businesses that are dependent upon them, are left vulnerable.

For the foregoing reasons, there is a need for a method for defining security policies at a high level and having the ability to automatically generate machine compatible rules for multiple layers in the network.

SUMMARY OF THE INVENTION

The present invention includes a system to provide secure, configurable access to computer network resources. According to one embodiment, a language for defining access policy rules may be provided. Rules in this language are converted in an automated fashion into filters applied within the various subsystems and components in the multi-layer security system. Calculating the rules once and simultaneously transmitting them to the different subsystems eliminates the need to make multiple independent determinations of the rules. Furthermore, since the rules needed by the different subsystems at the different levels can be quite varied in format, developing them automatically from the human readable rules eliminates the need for having multiple rule generation mechanisms and requiring that the human operator work with each of those systems. According to one embodiment, a user interface for defining these human readable access policy rules.

According to one embodiment, a network user is authenticated by an access control security system that obtains basic information about that user, including but not limited to the user ID, source address, physical unit and interface, protocol, encryption status, time, client, client status, and type of authentication. Based on the user ID, a set of abstract policies can be retrieved. The retrieved policies are associated with the user and the groups associated with that user. Based on the retrieved rules a set of rules for multiple layers of the network may be generated and applied to those subsystems. According to one embodiment, the set of rules for multiple layers of the network is eliminated when the user logs out, when the session times out, or when an administrator terminates the session.

According to one embodiment, the rules are generated and installed at the firewall level, the authentication and authorization level, the stateless web server level and the stateful web defense level (as defined below). In one embodiment, the process of automatically generating the set of rules for layer 4 (e.g., the transport layer) includes the generation of port filters in a firewall, generation of allowed protocols in the firewall, network address translation (NAT) and security association. In another embodiment, the set of rules created for multiple layers of the network is dependent on the configuration of the network, with each multilayer security unit being configured according to its location on the network.

In one embodiment of the invention, two or more of the subsystems may be placed in series with different types of processing occurring in each of the subsystems. In this embodiment each subsystem provides all of the filtering possible before passing packets onto the next subsystem, thus reducing the workload of subsequent subsystems. By organizing the subsystems to provide the lowest level filtering first and higher level filtering in subsequent stages, it is possible to decrease the workload for subsystems providing more complex filtering.

In one embodiment, user authentication, resource access, attempts at unauthorized access, and other network events are logged. Logs can then be filtered, sorted, and otherwise manipulated to audit network usage, detect intrusions, and in some cases, automatically activate or generate new rules for protection of the network in response to identified events.

These and other features and objects of the invention will be more fully understood from the following detailed description of the embodiments, which should be read in light of the accompanying drawings.

In this respect, before explaining at least one embodiment of the invention in detail, it is to be understood that the invention is not limited in its application to the details of construction and to the arrangements of the components set forth in the description of illustrated drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

FIG. 9 illustrates a few representative filter applications, according to one embodiment.

DETAILED DESCRIPTION

Figure 1:
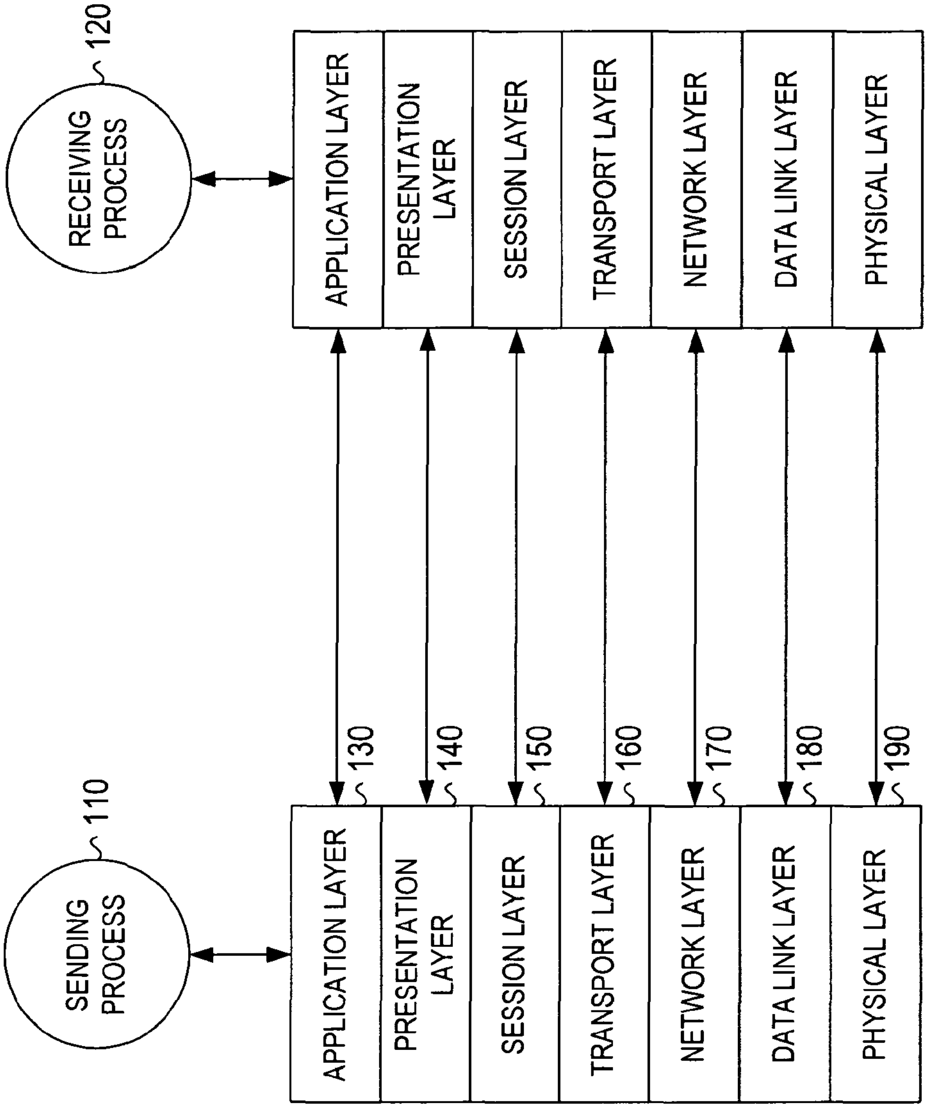
FIG. 1 illustrates an exemplary flow of communications between a sending process and a receiving process, according to one embodiment.

In describing an embodiment of the invention illustrated in the drawings, specific terminology will be used for the sake of clarity. However, the specific terminology is not limited to a particular embodiment and in fact may be applied to multiple embodiments. Moreover, the embodiments are not intended to be limited to the specific terms so selected, and it is to be understood that each specific term includes all technical equivalents which operate in a similar manner to accomplish a similar purpose.

The many features and advantages of the invention are apparent from the detailed specification. Thus, the appended claims are intended to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention.

Definitions

When used herein, the following terms will have at least the following meanings:

Human readable access rules define what types of resources and services users (including other machines) have access to.

Specific access rules are the rules which may be developed at least in part from the human readable access rules to enable both hardware and software to perform the actual filtering of packets and requests.

A resource is defined as an object of any type (file, program, folder, web page, or any other computer readable object), machine, network or service for which access is desired. A service can include any computer-provided service including but not limited to File Transfer Protocol (FTP), streaming media, or Internet telephony. Although the term resource may encompass services, services are sometimes separated out to distinguish objects such as files, folders, and web pages, from services that involve more than transfer of a limited amount of information.

System Overview

Figure 2:
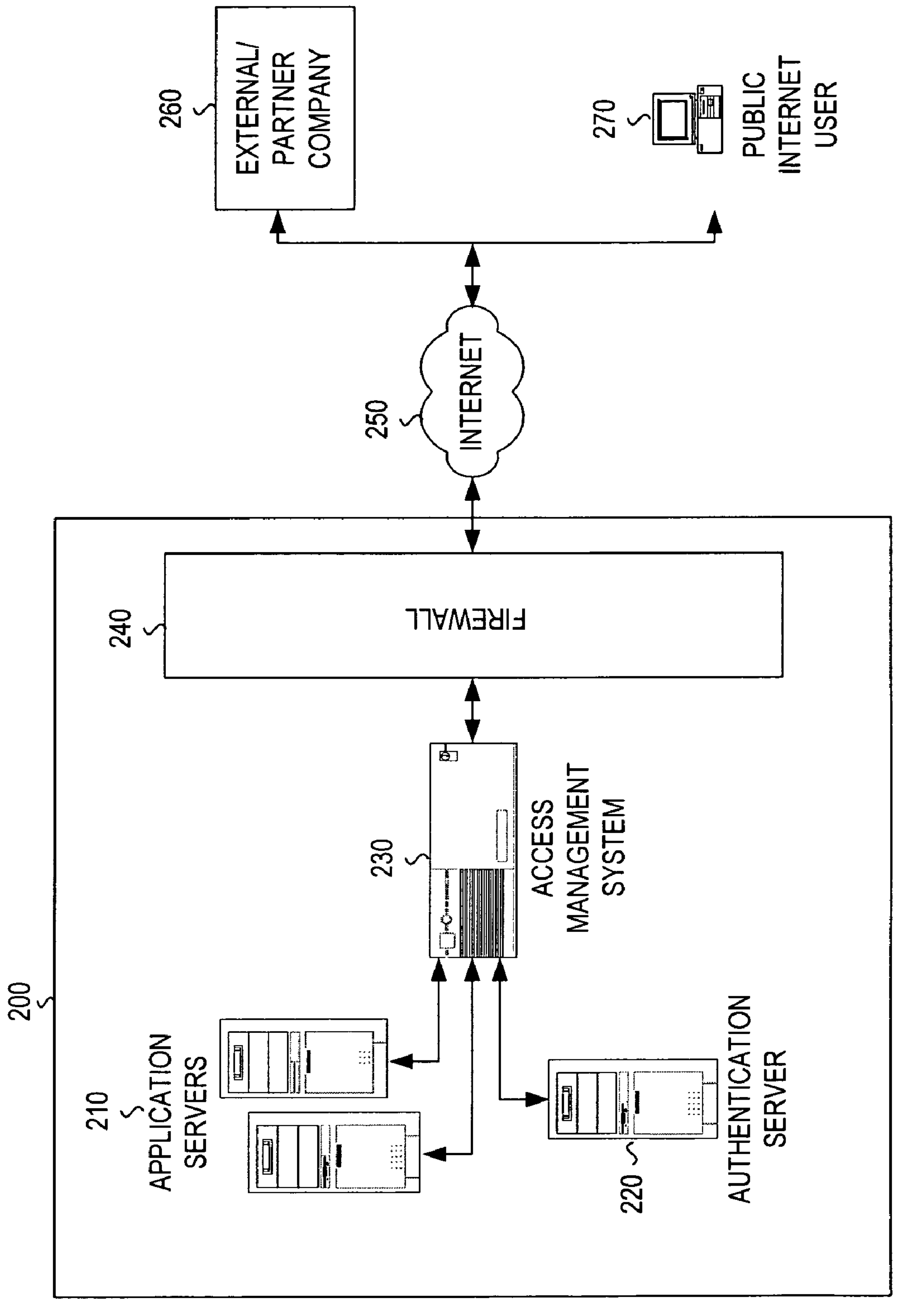
FIG. 2 illustrates an exemplary system architecture of a network or network segment connecting to the Internet through two layers of network protection equipment, according to one embodiment.

FIG. 2 illustrates an exemplary system architecture of network or network segment 200 connecting to the Internet 250 through two layers of network protection equipment. The network/network segment 200 may be a network internal to a location or facility (e.g., corporate network). The network 200 includes application servers 210 and an authentication server 220. A Multilayer Access Control Security System (MACSS) 230 and a firewall 240 provide protection for the network 200. The application servers 210 and the authentication server 220 are connected to the MACSS 230 which is connected to the Internet 250 through the firewall 240. An external/partner company 260 and/or a public Internet user 270 are also connected to the Internet 250. An exemplary operating scenario may be that a company desires to enable the external/partner company 260 to access the application servers 210 while blocking the public Internet user 270. It should be understood that the exemplary system architecture is a simplified architecture for illustrative purposes. That is, system architecture is likely to include many more servers, external and partner companies, and public Internet users. Additionally, although the firewall 240 is shown inside the network/network segment 200, it can alternatively be outside the network/network segment 200, or may in fact not be present, since MACSS 230 accomplishes some or all of the functions of firewall 240. Other network configurations are possible, and the configuration of FIG. 2 is not intended to limit or constrain how the system can be utilized.

The firewall 240 provides traditional proxy/firewall protection based on simple packet rules. The typical proxy/firewall will block most or all external intruders, while allowing users within the company to access internal resources as well as resources connected to the Internet 250. The MACSS 230 provides for authenticated, secure access to internal server equipment (e.g., application servers 210) through the use of more complex, multi-layer packet filtering rules, along with a means for authenticating users wishing to access resources within the company.

Figure 12:
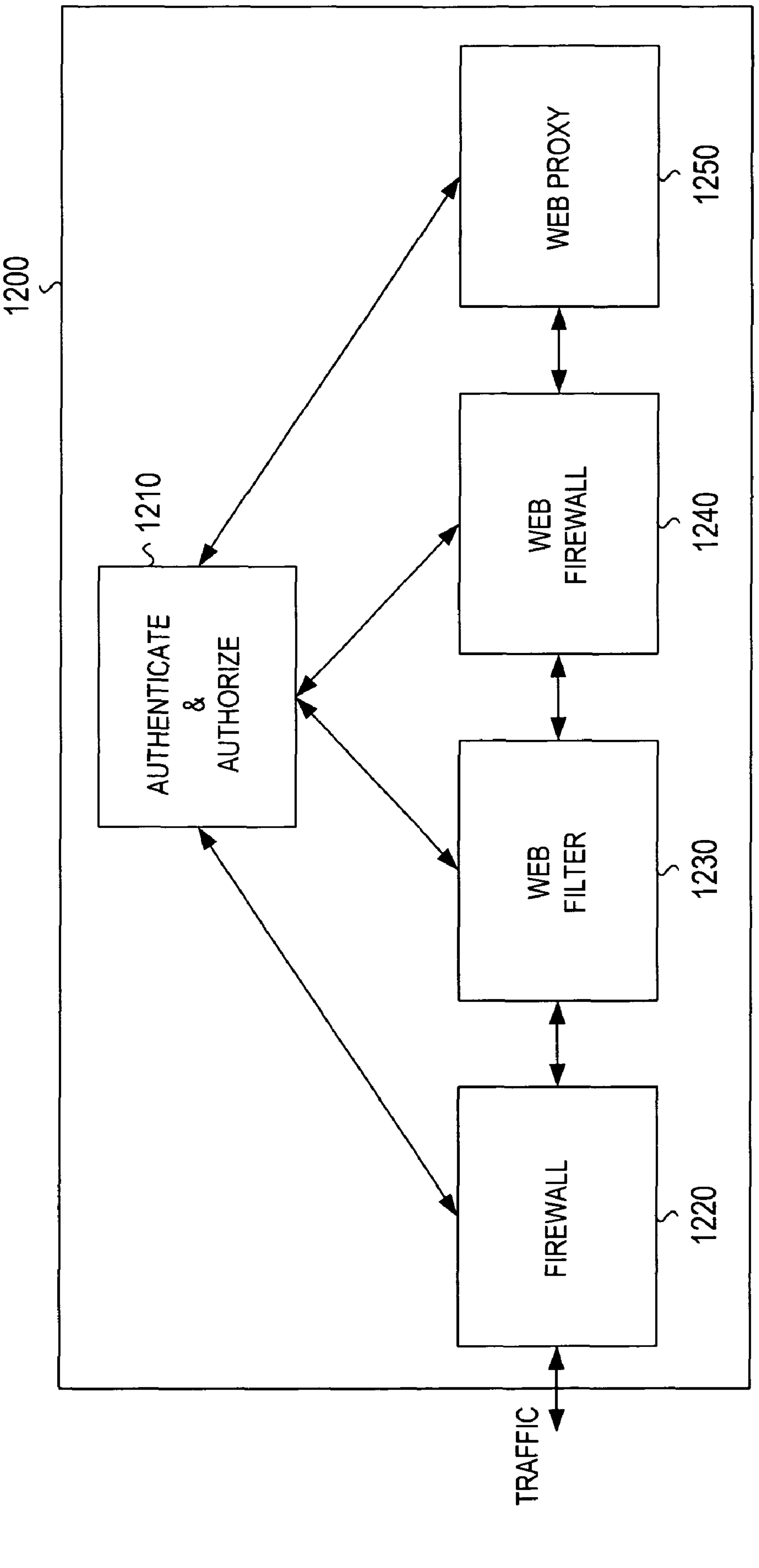
FIG. 12 illustrates an exemplary MACSS utilizing a centralized authentication and authorization subsystem, according to one embodiment.
Figure 13:
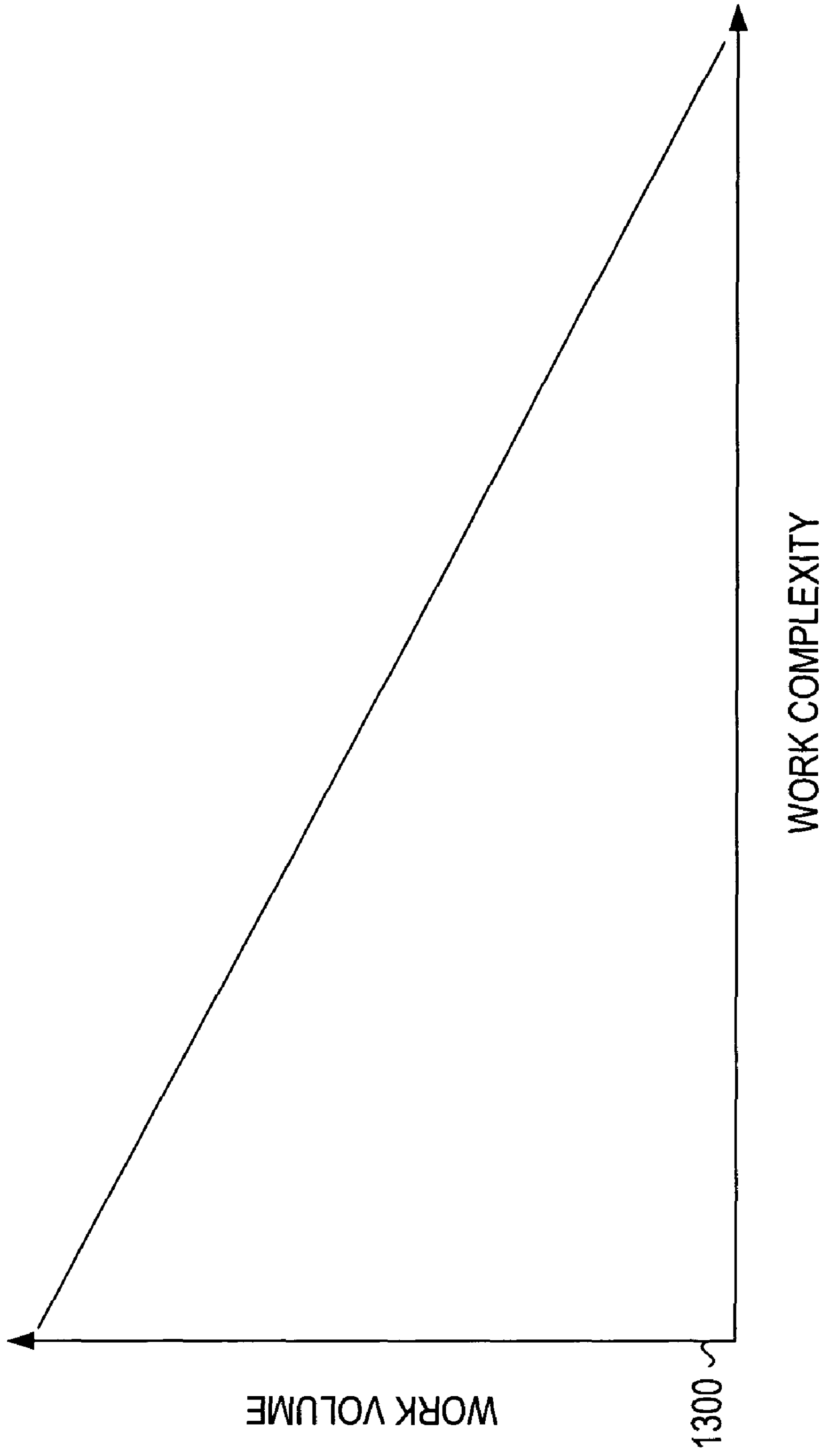
FIG. 13 illustrates an exemplary work distribution graph, according to one embodiment.

As will be described herein in greater detail, a system administrator uses user interfaces such as those illustrated in FIGS. 4 and 5 to create access/security rules that allow users access to specific network resources based on a variety of parameters including group membership and time of day. Once the user logs in, the MACSS 230 accesses a set of rules that can be distributed to subsystems operating at several layers of the network for access control and security. As illustrated in FIG. 12, the rules are distributed to subsystems that are able to limit access and filter (drop) packets associated with suspicious behavior. By providing for filtering at several levels based on a set of coherent rules applied to multiple layers, it becomes possible to effectively filter packets at the lowest level using simple processing, and avoid filtering those packets at higher layers such as the application layer, where filtering is a complex and computationally intensive process. The concept of decreasing work volume at higher layers (increasing work complexity) as accomplished by the architecture of FIG. 12 is illustrated in FIG. 13.

System Architecture and Operation

Figure 3:
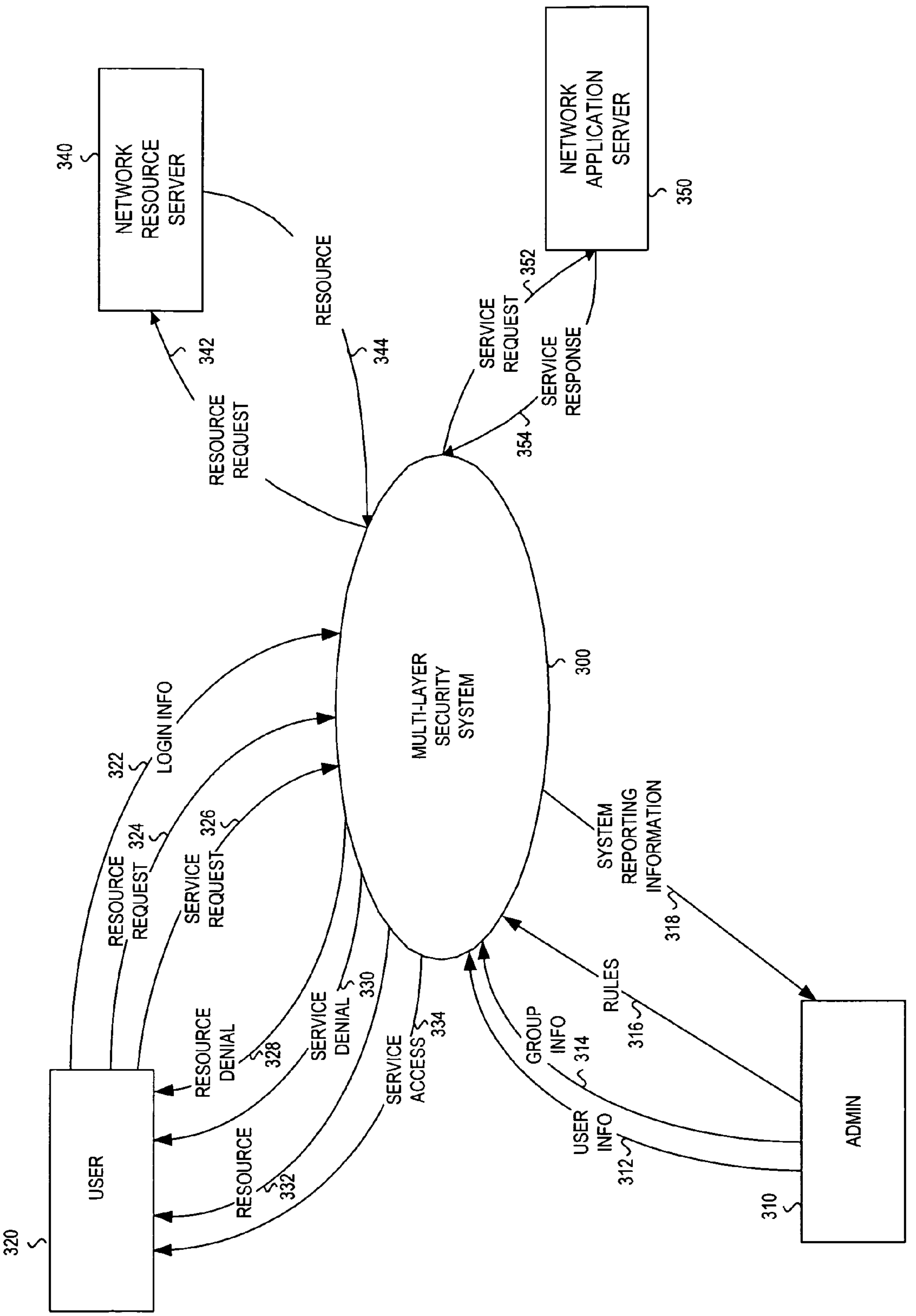
FIG. 3 illustrates an exemplary context diagram for a Multilayer Access Control Security System (MACSS), according to one embodiment.

FIG. 3 illustrates an exemplary context diagram for a MACSS 300. The MACSS 300 communicates with an administrator 310, users 320, network resource server(s) 340 and application server(s) 350. The administrator 310 configures the MACSS 300 by providing user information 312, group information 314, and access rules 316. The MACSS 300 provides the administrator 310 with system reporting information 318 (e.g., information regarding usage).

To gain access, the user 320 provides the MACSS 300 with login information and/or credentials 322. In one embodiment the login information is a user name, and the credential is a password. Other types of login information and credentials, including secure ID systems, in which synchronized pseudo-random number generators are used for authentication, can be used as credentials. Systems for authentication are well known to those skilled in the art and include systems offered by RSA Security Inc. including hardware tokens, software tokens, mobile authentication, digital certificates and smart cards. Biometric systems including face, fingerprint, or iris reading and recognition systems can also be used to provide authentication as part of logging in with credentials.

The user 320 then submits requests for resources 324 and requests for services 326. If the user 320 is not authorized to access a particular resource, access to that resource will be denied 328. If the user is not authorized to access a particular service, access to that service will also be denied 330. If the MACSS 300 permits access to a resource, the MACSS 300 presents a resource request 342 for the resource to the server 340 containing that resource. The resource server 340 returns the resource 344 to the MACSS 300 which provides the resource 332 to the user 320. If the MACSS 300 provides access to a service, the MACSS 300 presents a service request 352 to the server 350 providing that service. The application server 350 provides the MACSS 300 with a service response 354. The MACSS 300 provides the user 320 with service access 334 based on the service response 354.

Figure 7:
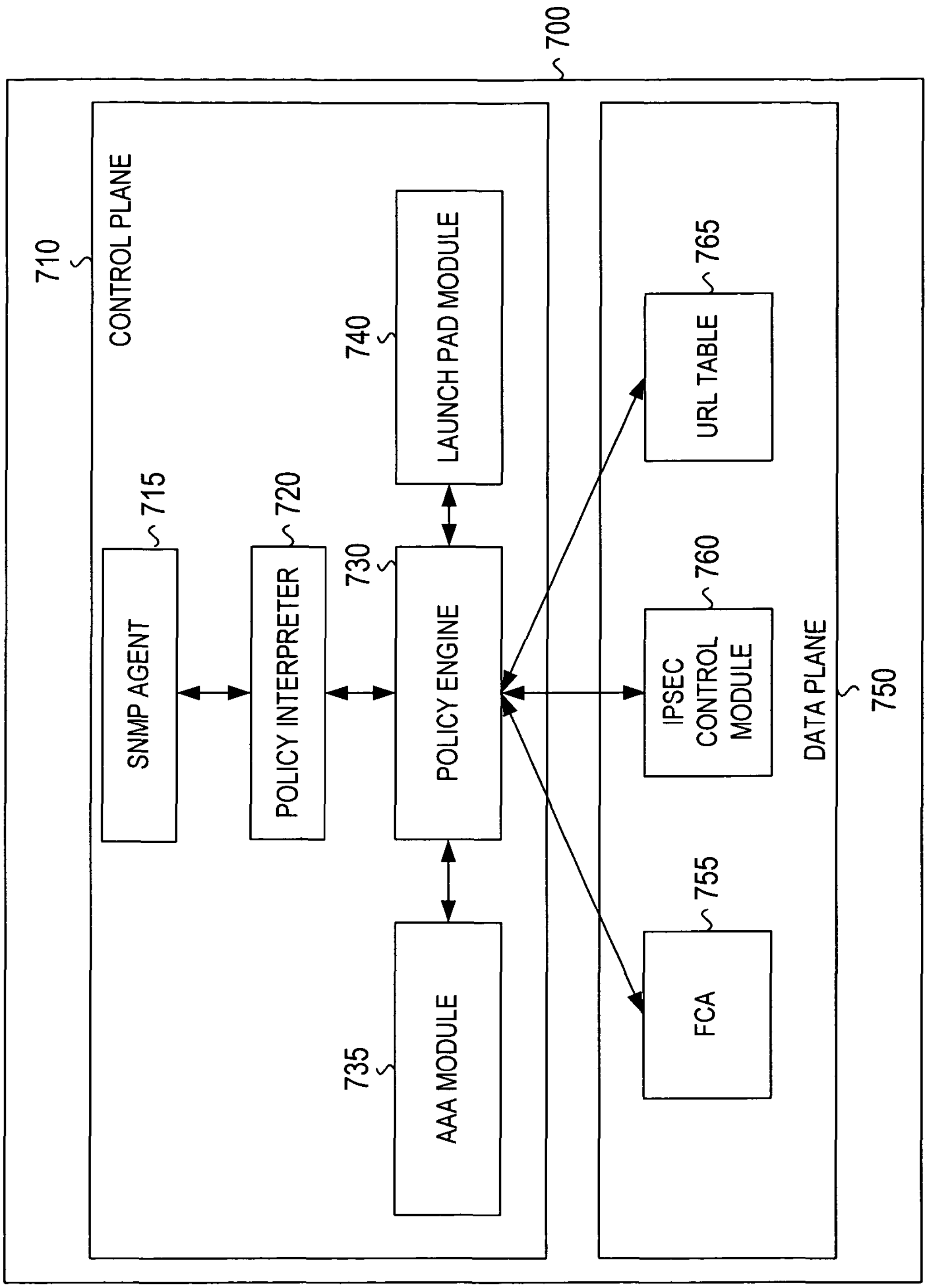
FIG. 7 illustrates an exemplary block diagram of a MACSS, according to one embodiment.

FIG. 7 illustrates an exemplary block diagram of a MACSS 700. The MACSS 700 has a control plane 710 and data plane 750. The control plane includes an SNMP agent 715, policy interpreter 720, policy engine 730, Authentication, Authorization and Accounting (AAA) module 735 and launch pad module 740. The data plane 750 includes FCA module 755, IP security control module 760 and URL table 765.

The policy interpreter 720 interfaces to the SNMP Agent 715. The policy engine 730 talks to the components on the data plane 750 to install and remove filters in response to policy rules inserted by the SNMP agent 715 to a policy database. The policy engine 730 interfaces with the FCA module 755 for installing firewall and NAT rules, the IP security control module 760 for inserting IP security rules, and the URL table 765 for inserting URL prefixes.

The policy engine 730 uses the same underlying method to communicate with all of its partners. The interface used is a query-response protocol built on top of a message-based interface. For example, when the SNMP agent 715 wants to add an object to the policy database (inside the policy engine 730), it sends an Add message inside a packet to the policy engine 730. The policy engine 730 tries to insert the object into its policy database. If the insertion is successful, the policy engine 730 may reply with an OK message, otherwise it will send back an error message containing an error code that explains the reason for the failure. The interface between the policy engine 730 and its peers may be asynchronous, meaning that one side may send multiple requests before receiving the responses sent by the other side.

The interface between the policy engine 730 and the SNMP agent 715 may be used to add and delete policy objects. Since the policy interpreter module 720 may be implemented as an internal module to the policy engine 730 no additional interface is required. That is, when the interface between the policy engine 730 and the SNMP agent 715 is described it is also describing the interface between policy interpreter 720 and the SNMP agent 715.

After a user has successfully logged into the MACSS, the Launch-pad module 740 may contact the policy engine 730 to receive the list of resources that are available to that user. The policy engine 730 may then search the resource access rules (contained in the policy database) for the user (or User Groups the user belongs to) as the source. Once found the policy engine 730 may return each of the resources in those rules back to the Launch-pad module 740.

The AAA module 735 notifies the policy engine 730 when a new user successfully logs in to the system. The notification contains a user ID as well as the source IP address of the user. When the policy engine 730 receives a notification that a user has logged in to the system, it activates the transport layer 4 (L4) resource access rules associated with that user and any user groups the user belongs to. Conversely when a user logs out from the system the AAA module 735 may notify the policy engine 730 about this so all the resource access rules are removed from the FCA 755 and authorization portion of AAA module 735.

Figure 8:
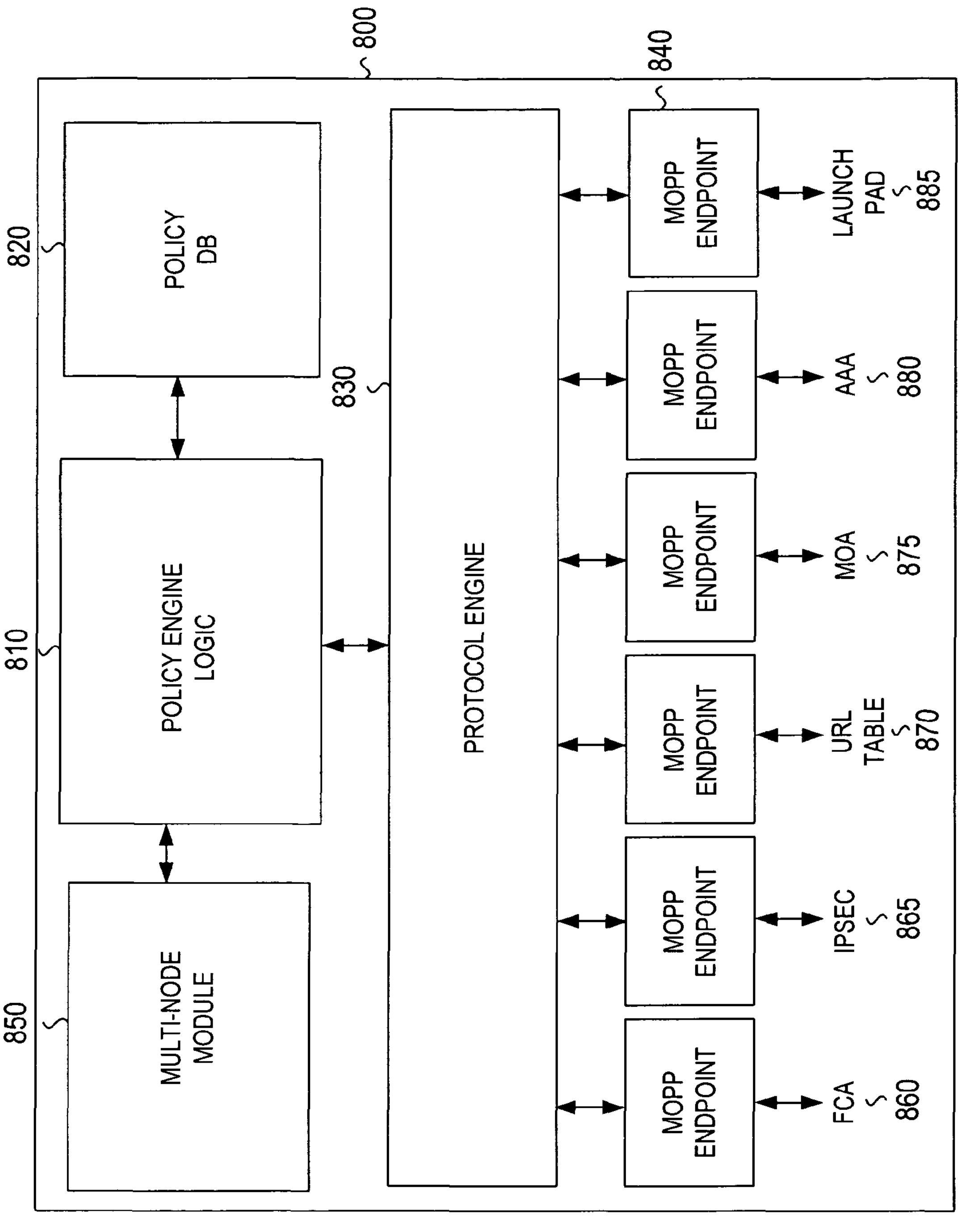
FIG. 8 illustrates exemplary basic building blocks of a policy engine, according to one embodiment.

FIG. 8 illustrates exemplary basic building blocks of a policy engine 800. The policy engine may include a policy engine logic 810, a policy database 820, a protocol engine 830, Managed Object Propagation Protocol (MOPP) endpoints 840 and a multi-node module 850. The policy engine logic 810 is the core of the policy engine 800. The policy engine logic 810 receives policy objects from an SNMP agent, verifies that the new policy objects do not conflict with pre-existing objects (performs conflict analysis), adds the objects to the policy database 820 (if no conflicts exist), and inserts them into data plane components via the MOPP endpoints 840 (installing data plane filters that correspond to these objects). The policy engine logic 810 is responsible for activating rules (e.g., installing FCA filters), finding the resources available to users when they log in to the MACSS, and producing the list of resources available to each user so it can be presented at the user's Launch Pad.

The policy database 820 is responsible for storing the policy objects in a way that provides fast lookups for objects using their object name. The policy database 820 is responsible for hiding the implementation details of the database from the rest of the code. This allows the underlying database to evolve from an in-memory implementation to a Relational Database Management System (RDBMS), or other data storage technology, without affecting the rest of the system. The policy engine logic 810 is the interface to the policy Data Base (DB) 820. Accordingly, when an object needs to be added to or deleted from the database, all necessary checks will be performed by the policy engine logic 810.

The protocol engine 830 may implement the managed object propagation protocol (MOPP). The policy engine 800 may interface with each of its peers via the various MOPP end points 840. The protocol engine 830 may encapsulate the lower level network interface to each of the policy engine's peers and may buffer messages as they are sent to and received from the peers. When the policy engine logic 810 wants to communicate with one of the policy engine's peers, the protocol engine 830 shields the policy engine logic 810 from all the details of the MOPP protocol. On the receiving side, the protocol engine 830 can receive well formed MOPP messages, decipher their contents, and then call another method to do further processing. On the sending side, the protocol engine 830 provides methods that, given the correct parameters, will assemble well-formed MOPP messages and use a MOPP end point 840 to send the messages through the network to a peering process.

The multi-node module 850 provides the interface between other MACSSs that may be used within a system. There may be one MOPP end point 840 for each policy engine peer (FCA 860, (Internet Protocol) Security Protocol or IPSEC 865, URL Table 870, Managed Object Adaptor (MOA) 875, AAA 880, and Launch Pad 885). In an alternate embodiment, the MOA 875 can be incorporated into an SNMP agent.

FIG. 9 illustrates a few representative filter applications. A first filter 910, which may be installed in a web filter component, may allow access to a specific set of web resources with a specific URL prefix to a specific set of users. In this case, user ID 123 is among the authorized users for the set of resources, and the incoming request is allowed. A second filter 920, which may be installed at the L3/4 firewall level, may allow access to a specific IP address and port combination. In this case, an incoming request to the opened port would be allowed. A third filter 930 may illustrate the ability to redirect requests for resources on an internal network to alternate instances or versions of those resources on a secure extranet using the web firewall functionality. In this case, requests for content with a specific URL prefix may be remapped to requests over a secure protocol to resources with a different prefix.

Referring back to FIG. 8, each of the policy rules in the policy database 820 may be translated to one or more filters that are installed in the data plane. More than one rule might have to be combined to produce one or more filters. For example, resource access rules are combined with NAT rules to create the filters installed to the FCA. The policy engine 800 may keep the association between policy rules and filters so when a rule is deleted all the created filters are also deleted from the data plane. Furthermore, when a policy component referenced by a policy rule is deleted, only the affected filters should be deleted. For example, consider a resource access rule that uses a network group as its source field. For each of the networks in the network group, one filter will be installed to the FCA. When one of these networks is deleted only the related filter should be deleted while the rest should remain installed to the FCA.

The policy engine 800 may keep a list of the installed filters. The lists may include a filter ID (uniquely identifies the filter installed to the data plane), pointers to end point(s), resources and services that were used to create the filter, and a pointer list to the rules that were used to create the filter (e.g., an FCA filter would contain a pointer to the Resource Access rule and to the NAT rule that were combined to create it).

According to one embodiment, each of the policy rules has filter pointer lists. When a rule is first created these lists are empty. The policy engine logic 830 then translates the policy rule to a list of one or more filters that have to be installed to the data plane. The policy engine logic 810 then signals the protocol engine 830 to deliver requests to the data plane components for each of these filters. Since the interface between the policy engine 800 and the data plane components is asynchronous, there is some delay from the time the request is sent and the time the responses are received from the data plane.

During this period, each of the filters may be added to a common add filter list and a pending add filters list for the rule. When the response comes back from the data plane, the filter may be looked up in the add filter list (using the filter ID) and the appropriate rules are removed from the pending add filters list, added to an installed filters list, and added to a common filter list. When all of the filters associated with a rule are installed, the add filter list is empty and the installed filters list contains pointers to filter elements in a global filter list.

When a rule is deleted, all of the filters from the installed filters list may be moved to the pending deleted filters list, requests are sent to the data plane to remove those filters, and the filters are added to the common delete filter list that contains all the filters for which a delete request has been sent but a response has not yet been received. When the response from the data plane arrives, the rules are notified, and the filters may be deleted from the pending deleted filters list as well as from the global filter list.

The policy database 820 provides interfaces to add new objects and efficiently find and delete objects based on their object type and the object name. Internally, all objects of the same type are stored in a fixed array. This array is indexed by an Standard Template Library (STL) map. The map stores a mapping between the object ID and a pointer to where the object is stored in the internal array. When a request for a new object comes, the policy database 820 finds the next available entry in the Object Array and copies the Object in that entry. The policy database 820 then marks the object as full, inserts the object's ID in the ID Map and sets the pointer to point to the newly added entry.

On the other hand, when a request to find or delete an object comes, the policy database 820 looks up the object ID in the ID Map and if the name is found, it follows the pointer to where the object is stored. The pointer to the object is either returned or set to empty and the object name is removed from the Name Map. If the object does not exist, the pointer will return a NULL or throw an exception.

Before a new rule is added to the policy database 820 a set of validation tests are performed to ensure that the new rule does not conflict with existing policy rules. If the validation tests find no conflict then the rule can be installed, otherwise an error message is returned pointing to the first of the rules that the new rule conflicts with. It should be noted that the policy engine 800 will not try to resolve the conflicts, but will only report them. The resolution of conflicts is left to the administrator of the MACSS. If the administrator decides that a conflict does not really occur then it can re-install the rules with the "force" option in which case no validation happens and the rule is installed to the database. According to one embodiment, the resolution of the conflicts could be performed automatically.

In the case of resource access rules that reference Layer 4 resources, once the validation phase has finished the rule will be combined with the NAT rules in the policy database 820 that are applicable to the same traffic stream as the one referenced by the new rule. Once the policy engine 800 receives the two rule sets, it will combine them to create the set of filters that will be installed to the FCA. The combination algorithm works by taking each firewall rule (layer 4 resource access rule) and finding the NAT rules this rule intersects with. For each of these rules, the intersection between the firewall rule and the NAT rule is computed and this intersection produces the original source, original destination and original service fields in the filter. The new source, new destination and new service fields are taken from the NAT Rule. The action and peer fields are taken from the firewall rule. The priority of the new filter is computed by shifting the priority of the firewall rule by 16 bits and then adding the priority of the NAT rule. This allows creation of unique filter priorities that keep the priorities of both the firewall and NAT rule respectively.

In order to filter out redundant filters, the policy engine 800 keeps a list of the already installed filters. When a new rule is added, it is expanded and each of the expanded filters is checked against the already installed filters. If, during this phase, the new filter is found to be redundant, it is discarded. The algorithm used to find whether a filter is redundant is the same as the algorithm used for rule conflicts. The policy engine 800 logic contains the main execution loop and is structured around an event loop where events are received from the six interfaces and are processed as they arrive.

Figure 10:
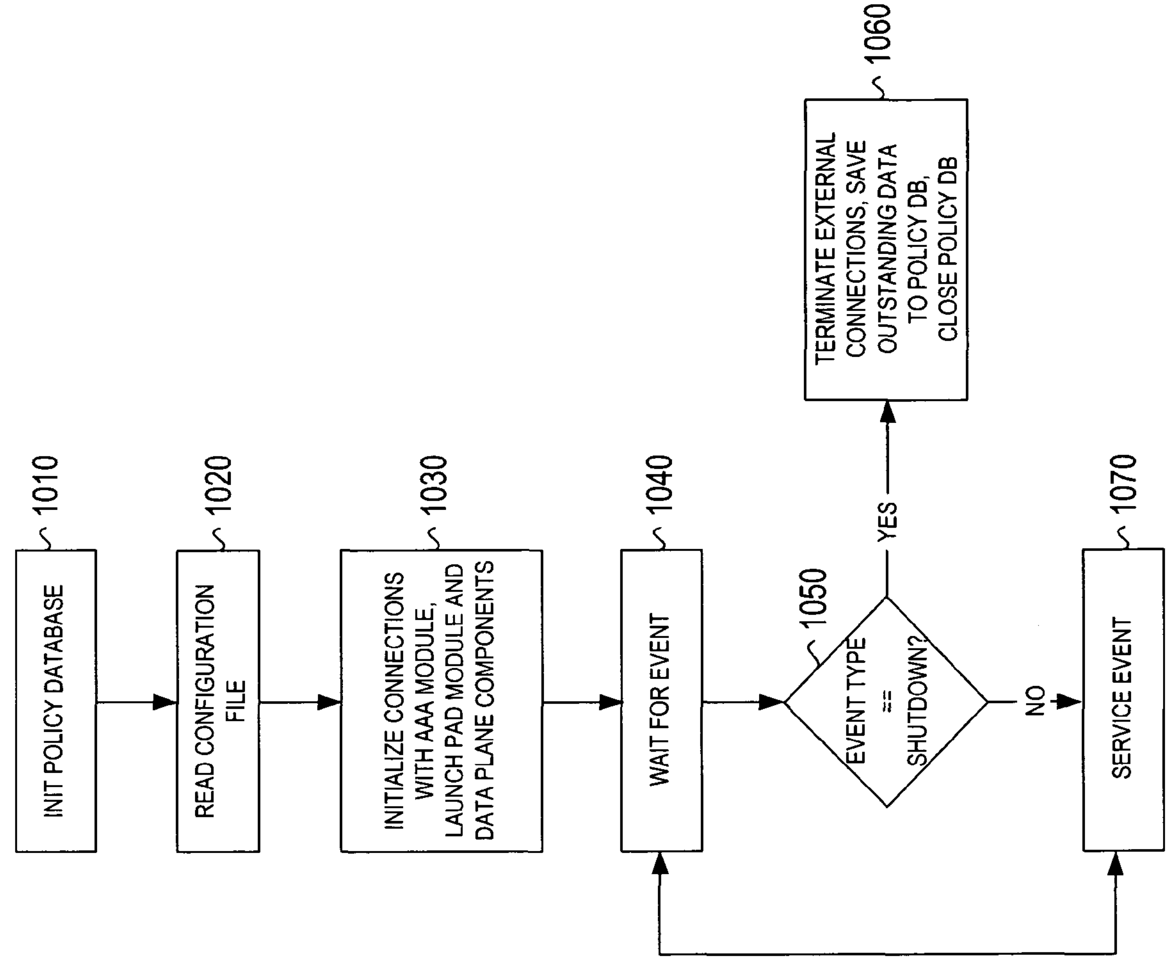
FIG. 10 illustrates an exemplary main loop of a policy engine, according to one embodiment.

FIG. 10 illustrates an exemplary main loop of a policy engine. Initially, the policy database may be initialized 1010 and a configuration file may be read 1020. The policy engine then initializes the connections with the external peers 1030. The policy engine then waits for events to happen 1040. Once an event occurs, a determination is made as to whether the event is a shutdown event 1050. If the determination 1050 is that the event was a shutdown (1050 Yes) the policy engine stops its normal operation, closes the external connections and then terminates 1060. If the determination 1050 is that the event was not a shutdown (1050 No), the event is processed 1070 and the process returns to the wait state 1040.

Figure 11:
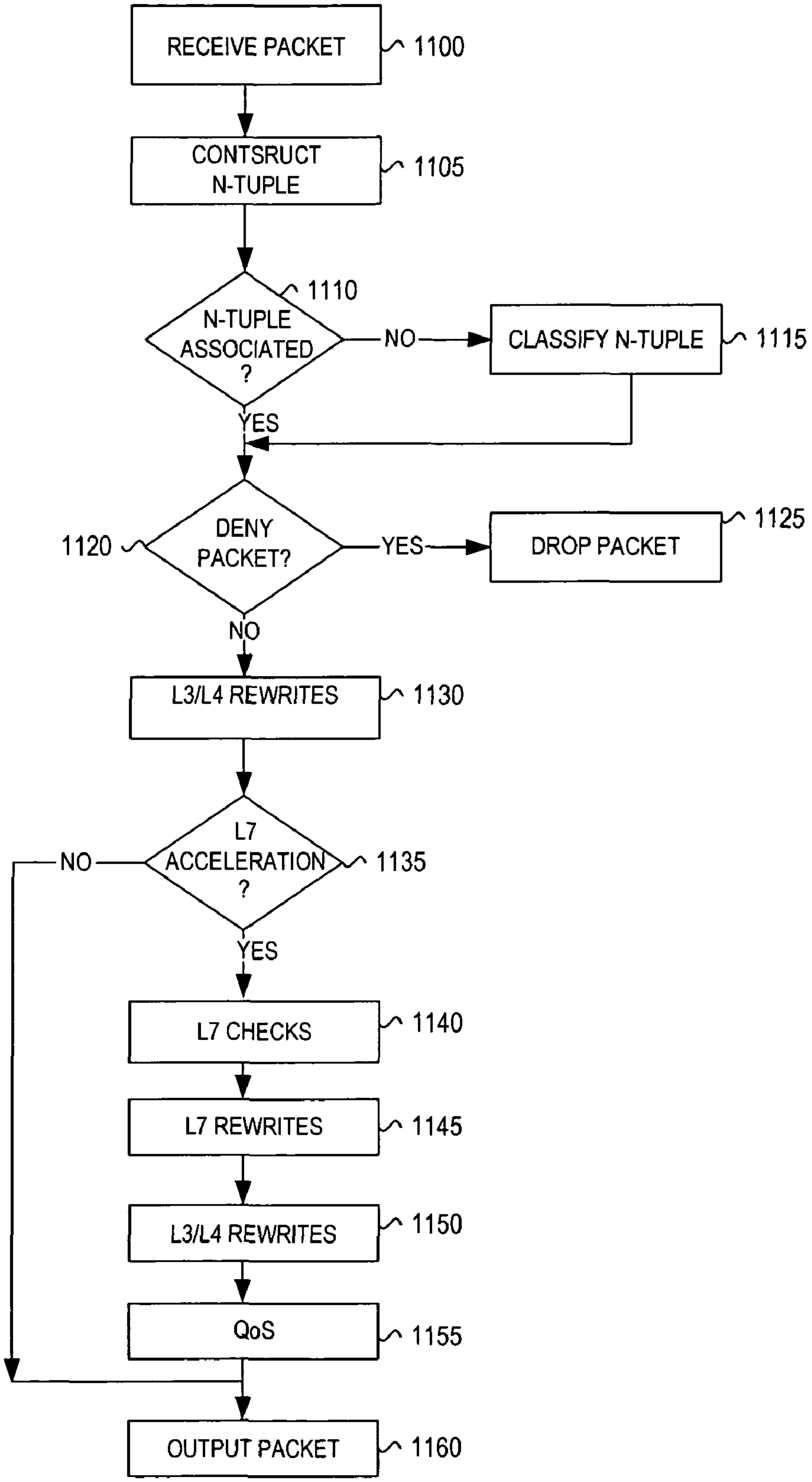
FIG. 11 illustrates an exemplary flow chart of rule application, according to one embodiment.

FIG. 11 illustrates an exemplary flow chart of rule application. The process starts when a packet is received 1100 by a MACSS. The MACSS looks at flow identification data (e.g., source port, source IP address, destination port, destination IP address, IP protocol, VLAN-ID) within the header of the packet. Some subset of the flow identification data is used by the MACSS to uniquely identify the flow of the packet (these parameters are collectively known as the N-tuple) 1105. The N-tuple can be used to associate rules with the packet. The rules identify the functions that should be applied to the packet (e.g., where the frame is to be routed, the priority of the frame, the protocol). A determination is made as to whether the N-tuple is associated with any rules 1110.

If the packet is not associated with any rules (1110 No), it may be classified 1115. Classification 1115 involves searching the N-tuple elements against a rule set. When an incoming packet matches a rule, a set of operations can be associated with this packet. After a frame has been classified its N-tuples and classification result are added to an identification database (an association is made). The packet then proceeds to be processed based on the associated rules. If a packet arrives with the same N-tuple values it need not be re-classified as the determination 1110 would be that the N-tuple was associated with rules (1110 Yes). Whether the packet was required to be classified or not, the packets are processed based on the associated rules.

Initially a determination is made as to whether the associated rules indicate the packet should be denied 1120. If the determination 1120 is that the packet should be denied (1120 Yes), the packet is dropped 1125. Dropping the packet at this point precludes the need for further processing including determinations as to violations of security or access policies. If the determination 1120 is that the packet should not be dropped (1120 No), layer 3/4 (L3/4) rewrites are performed 1130. The L3/4 rewrites may include decryption and NAT. A determination is made as to whether the packet represents layer 7 traffic and if L7 acceleration is needed 1135. If L7 acceleration is needed (1135 Yes), the process continues with L7 checks 1140, L7 rewrites 1145, L3/4 rewrites 1150, and QoS prioritization 1155 prior to output of the packet 1160. If L7 acceleration is not need (1135 No), the packet is output 1160 after the L3/4 rewrites 1150 and QoS prioritization 1155.

Although not specifically illustrated in FIG. 11, an access control function can be added between L7 checks 1140 and L7 rewrites 1145. In the event that an access control function is present, a determination is made as to whether the user has permission for a specified application. If so, the rewrites are permitted. If not, the rewrites do not take place and the packet is discarded.

FIG. 12 illustrates an exemplary MACSS 1200 utilizing a centralized authentication and authorization subsystem 1210. The authentication and authorization subsystem 1210 is used to receive requests from a user (or other system) for resources protected by the MACSS 1200. The authentication and authorization subsystem 1210 authenticates a user and retrieves a set of policies associated with that user, those policies being derived from the human readable access rules entered by an operator/administrator (e.g., via the user interface depicted in FIG. 4).

The policies can be determined both by the identity of the user as well as by the group the user is associated with, as well from other parameters associated with the network (e.g. current IP address of the user, location of the user or location of the network the user is on). Based on the policies associated with that user, a set of specific access rules are generated that enable the subsystems to provide filtering and deny access to prohibited resources and services. These specific access rules allow the subsystems to operate at the various layers to provide different types of filtering.

According to one embodiment, the subsystems include a firewall 1220, a web filter 1230, a web firewall 1240, and a web proxy server 1250. The firewall 1220 operates at layer 4 (transport) whereas the remaining subsystems are operating at layer 7 (application). The firewall 1220 serves to prevent unauthorized access to a network, and to resources such as the web proxy server 1250, by filtering out packets that originate from unauthorized users or sources. Performing filtering of packets can be effective in deterring certain types of unauthorized access attempts, but requires inspection of each packet. In addition, the firewall 1220 is susceptible to IP spoofing, in which an intruder uses the IP address of a trusted source to gain unauthorized access.

The web filter 1230 provides a stateless web defense in that it prohibits certain operations and allows others with no knowledge of the previous page or resource requests. Because of the inherent stateless nature of the web (HTTP requests are made independent of previous requests) it is difficult to determine the state (history) of a web request, and such processing is best done in a separate subsystem. According to one embodiment, the web filter 1230 allows operations such as GET, and HEAD, but denies operations such as PUT and POST. This allows for retrieval of information from the web server or other network resources connected to the web server, but prevents modification of those resources.

The web firewall 1240 provides a stateful web defense by maintaining knowledge of the history of web page and resource requests, and permits or denies those requests based on the previous requests of the user. The stateful defense is useful against a number of intrusion techniques, including forceful browsing in which the intruder adds extensions to a known URL in an effort to enter a protected part of a web site. A number of techniques can be used to maintain state, including cookies and server side application software that monitors state. According to one embodiment, a signing process is applied to the URL and other items on a web page to create watermarked pages, thus allowing a stateful defense in web firewall 1240.

The web proxy 1250 provides the requested resources, or can, in some instances, refer the request to other servers on the protected side of the network. The web proxy 1250 can also provide additional application layer security. The web proxy 1250 provides additional security by terminating the request and putting it in canonical form, resulting in isolation of the real origin server from direct access by the user.

One advantage of the MACSS 1200 is that complex operations such as stateful web defense need only be performed on packets that have passed lower level, and generally less complex, filtering.

FIG. 13 illustrates an exemplary work distribution graph 1300. As illustrated, most of the work is performed at lower levels of the networking hierarchy, where the filtering, discrimination, and other security checks are simpler to perform. By decreasing the number of packets that are checked at higher levels, the overall efficiency of the access control and security process can be greatly increased.

Referring back to FIG. 12, the firewall 1220 has the highest workload and performs the simplest of filtering, whereas the web firewall 1240 and the web server 1250 perform complex security tasks, but only on those packets that have passed through the prior stages. As previously discussed with respect to FIG. 1, if packets can be discarded at a lower level (e.g. determination 1120 occurring at L3/L4) it is unnecessary to perform more complex processing at higher levels (L7) thus eliminating the need to perform complex processing at higher levels on all packets.

Secure communications may be established either between the user and the MACSS, or the user and a network resource using a secure tunnel such as GRE (Generic Routing Encapsulation), PPTP (Point-to-Point Tunneling Protocol), L2TP (Layer 2 Tunneling Protocol), and IPSec (IP Security) or other secure tunneling mechanism. Alternatively, a user may simply use a Secure Sockets Layer (SSL) protocol to create a secure connection to the MACSS or a network resource.

When a user is logging into the system through SSL as opposed to a secure tunnel, a Java tunnel can be established between the MACSS and the client. The native application will reference the localhost as the server for the service. The Java tunnel established will intercept the traffic intended for the native server and send the packet up to the MACSS to be processed. At the MACSS end, there will be a module responsible for decrypting packets coming in from the Java tunnel and for dispatching the packets to the correct services.

For users that are internal to the network (e.g., network 200), such as an employee accessing a resource that is inside the network, it will, in some circumstances, not be necessary to establish a secure connection. In this case unsecured communications take place between the user and the MACSS or the user and the network resource. Alternatively, if there is a requirement for security a secure tunnel or SSL connection can be used in the internal network for connection to the MACSS or between the user and the network resource.

Software Architecture

Figure 14:
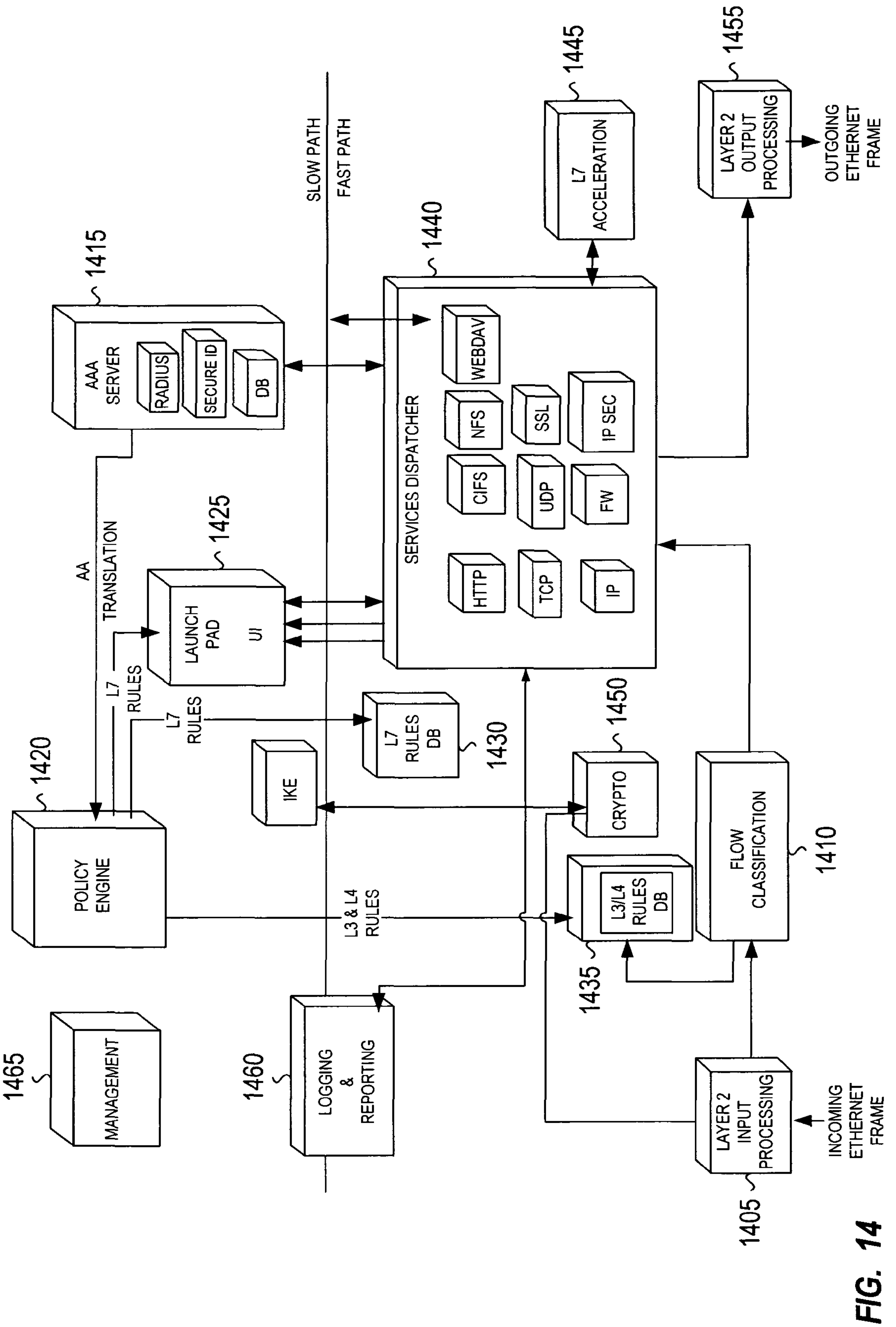
FIG. 14 illustrates an exemplary software architecture of the system, according to one embodiment.

FIG. 14 illustrates an exemplary software architecture of the system. The architecture includes layer 2 input processing 1405, Flow Classification Assist (FCA) 1410, an AAA server 1415, a policy engine 1420, a Launch-pad (user interface) 1425, an L7 rules database 1430, an L3/L4 rules database 1435, a service dispatcher 1440, an L7 accelerator 1445, a cryptography function 1450, layer 2 output processing 1455, a logging and reporting module 1460, and a management module 1465.

Incoming data is received and processed by the layer 2 input processing 1405. The FCA 1410 classifies incoming packets and is used by a firewall module as well as an IP security module. The AAA server 1415 is responsible for user authentication and authorization. The AAA server 1415 provides authentication and authorization data to the policy engine 1420. The policy engine 1420 is a collection of all the policy objects stored in a set of data structures (policy database). The policy engine 1420 provides L7 rules to the launch-pad 1425 and the L7 Rules DB 1430 and L3/4 rules to the L3/L4 DB 1435. The launch-pad 1425 is responsible for presenting the launch-pad screen to each logged-in user of the MACSS. The L7 Rules DB 1430 stores the active Layer 7 rules. The L3/L4 rules DB 1435 stores active Layer 3 and Layer 4 rules.

The FCA 1410 may compare the incoming frame (the L3/4 packet information) to the L3/4 rules by using hashing techniques and/or acceleration using FPGA, ASIC, or other hardware assist. The service dispatcher 1440 dispatches the appropriate services. The L7 Acceleration 1445 provides accelerated application (e.g., FPGA, ASIC, or other hardware assist) of the Layer 7 rules. The cryptography function 1450 provides accelerated encryption and decryption of data, possibly with the use of FPGA, ASIC, or other hardware. The outgoing data is processed and transmitted by the layer 2 output processing 1455.

Information about the operations of each of these modules may be communicated to the logging and reporting module 1460. User authentication, resource access, attempts at unauthorized access, and other network events can be logged. Logs can then be filtered, sorted, and otherwise manipulated to audit network usage, detect intrusions, and in some cases, automatically activate or generate new rules for protection of the network in response to identified events. The management module 1465 manages the operations of the system.

Figure 6:
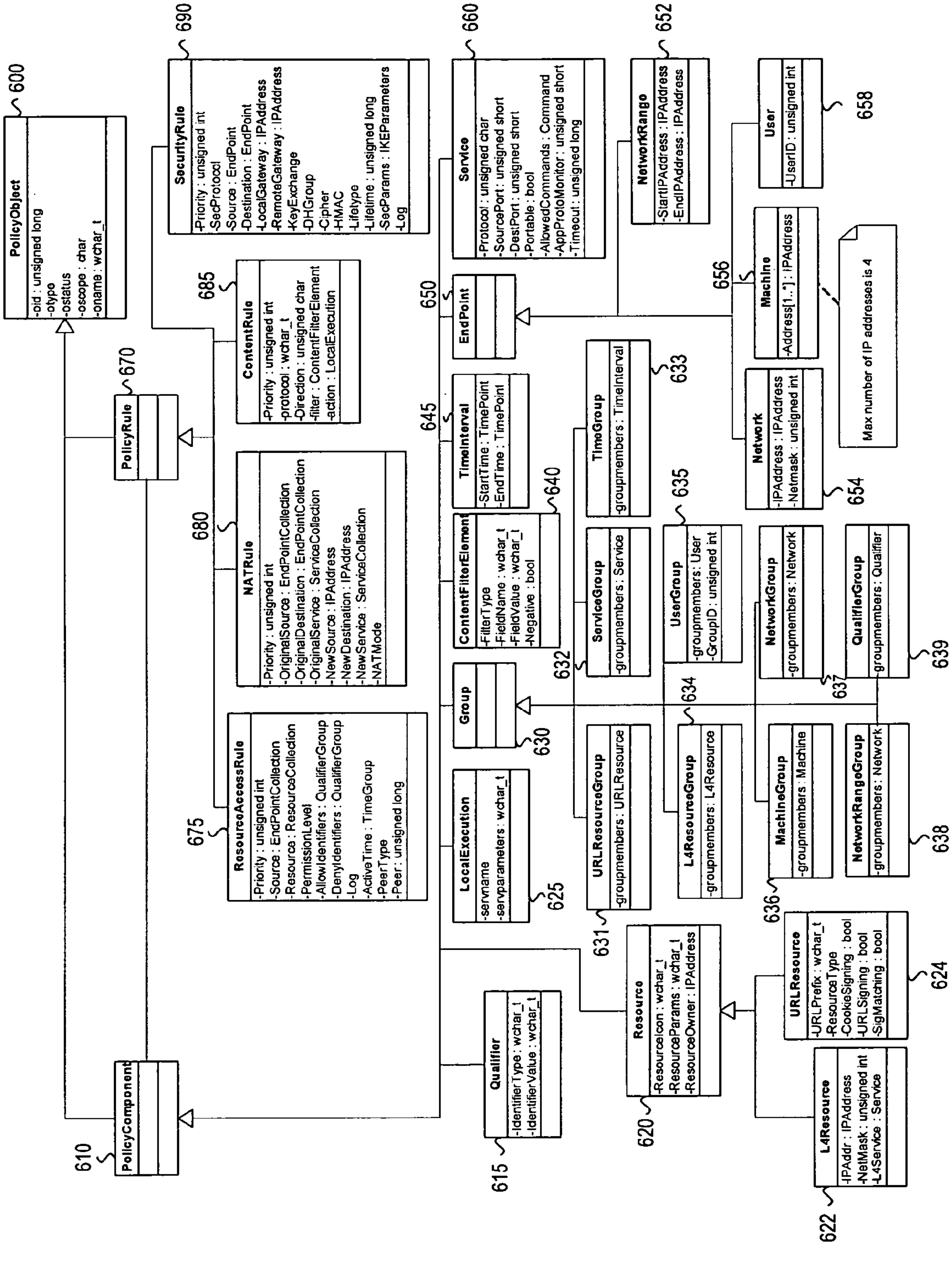
FIG. 6 illustrates an exemplary object model for policy objects, according to one embodiment.

FIG. 6 illustrates an exemplary object model for policy objects 600. The policy objects 600 are subdivided into policy components 610 and policy rules 670. All of the rules may be classified under the policy rules 670, while the rest of the objects may be classified under the policy components 610. The policy objects 600, policy components 610 and policy rules 670 are all abstract (i.e., in an embodiment they cannot be instantiated).

The policy objects 600 abstract base class may include member variables (common fields) such as identification (ID), type, status, scope and name. The ID is unique among all objects of the same type. The type identifies the type of object it is (to be discussed in more detail later). The status field identifies the state the object is in (e.g., ACTIVE, INACTIVE, INIT, INSTALLED, ERROR). The scope field is an unsigned integer specifying the domain the object lives in. This field is mainly used for controlling what boxes the object will be propagated to among the network of MACSSs. An object can belong in more than one scope. The name field is a mnemonic name for each of the defined objects. Another potential variable/field is a visibility field that specifies whether the object should be visible from a system administrator or not.

The policy components 610 may include qualifiers 615, resources 620, local execution 625, groups 630, content filters 640, time intervals 645, end points 650, and services 660.

The qualifiers 615 may be used to further restrict what type of requests can be issued against a Universal Resource Locater (URL) prefix. The restrictions are based on file extensions and method types. For example the administrator of the MACSS can specify that only GET requests for .html files can be allowed for a specific URL. The qualifier 615 includes identifier type and identifier value fields. The identifier type defines the methods that may be used, which may include but are not limited to: GET, HEAD, POST, PROPFIND, PROPPATCH, MKCOL, DELETE, PUT, COPY, MOVE, LOCK and UNLOCK. The identifier value defines the extension that may be used. Acceptable extensions include but are not limited to: .jpg., jpeg, .gif, .png, .txt, .exe, .html, .htm, .cgi, asp, jsp, .cer, cdx, .asa, .bat, .cmd, .com, .htw, .ida, .idq, .htr, .idc, shtm, .shtml, .stm, and .printer. The administrator of the MACSS can also define additional qualifiers.

Resource 620 is an abstract class capturing all the common attributes between transport (e.g., level 4 (L4)) resources 622 and URL resources 624. The resources 620 may define a resource icon, resource parameters and a resource owner (IP address). The resource icon specifies what icon will be used in a Launch-pad screen (user interface) for this resource. The resource parameters are a list of strings containing parameters needed to configure a client to use this resource. The resource owner specifies the MACSS that is "responsible" for this resource.

The L4 resources 622 defines a layer 4 resource (e.g., transport resources such as DNS servers, SAP servers) protected by the MACSS. The L4 resources 622 further identify an L4 service, an IP address for the L4 service, and a network mask specifying which servers the service is running on. The URL resources 624 define a URL protected by the MACSS. The URL resources 624 further define a URL Prefix, a resource type, a cookie signature, a URL signature, or a signature match. The attributes of cookie signature, URL signature, and a signature match can be "turned on" to enable the functions of state signing and security monitoring of the resource.

The local execution 625 object contains the actions that will be performed for requests that match the filters in a content rule. The local execution 625 includes service name (of services to be executed) and service parameters. One defined value for local execution 625 is FORWARD, which forwards a request to another MACSS.

The groups 630 are used to create a collection of other policy components 610 of the same type. This way a collection of machines, networks or users can be treated as a single entity. The groups include, but are not limited to URL resource 631, service 632, time 633, L4 resource 634, user 635, machine 636, network 637, network range 638 and qualifier 639.

The content filter element 640 defines which requests match a content rule. The content filter element 640 may identify a filter type as a string containing the name of the request or response field to be matched, a field name, a field value and a negative.

The time intervals 645 may include two time points (start and stop) which define a time interval between a starting time point and an ending time point. The time points may include year, month, day, hour and minute attributes. According to one embodiment, month values are from 1 to 12 (January to December), day values are from 1 to 7 (Monday to Sunday), hours from 1 to 24 (1:00 am to midnight) and minute values are from 1 to 60. A zero value is a wildcard. For example, if we want to define a time point corresponding to the beginning of work day (e.g., 8:30 am) on Mondays, then the year and month fields would have values equal to zero, day would be set to 1, hour set to 8 and minute set to 30.

The endpoint 650 is an abstract class used to group all of the policy components 610 that can be used as an endpoint for policy rules 670. For example, an endpoint 650 can be used as a source in a resource access rule or as an original source and an original destination in a NAT rule (to be discussed in detail later). The endpoint 650 can be defined as a network range 652, a network 654, a machine 656 and a user 658. The network range 652 defines a range of IP addresses. It contains a start IP address and an end IP address. The range is inclusive (that is, it starts from the start IP address and ends at the End IP address). The network 654 defines a network prefix and contains an IP address plus a network mask.

The machine 656 defines a network element such as an end host or a router and contains the Internet Protocol (IP) address (es) and the Domain Name System (DNS) name of the represented machine. The machine 656 object is used to define the source or destination for rule objects defined below. The user 658 uniquely identifies a user of the MACSS with a user ID.

The services 660 describe a service offered or allowed by the MACSS. Examples of services are destination port (e.g., 80 for web service, 1720 for NetMeeting). The service object 660 includes IP protocol number, source port, destination port, portable Boolean, allowed commands, application level monitors, and timeout parameters. The IP protocol number, source port, and destination port fields can be wildcards. The portable Boolean field shows whether a MACSS can locally proxy this service using a different destination port.

The allowed commands include a list of commands that are allowed for this particular protocol. Examples where commands may be used are Internet Control Message Protocol (ICMP) and Simple Network Management Protocol (SNMP) packets. In the case of SNMP, an administrator might want to allow only a certain type of SNMP requests to go through the MACSS (e.g. GET but not SET requests). According to one embodiment, if no command fields are specified then all protocol messages for this service should be allowed. The application level monitor field specifies which one of the application level monitors implemented on the MACSS (e.g. protocol monitor for FTP) will be used for this service. The expiration field defines when an idle session for this service will be removed from a flow classification accelerator (FCA).

The policy rules 670 are an abstract class that all policy rules derive from. The policy rules 670 have pointers to the policy components 610 that a particular policy rule 670 references. If the source or the resource attributes contain a group of machines or a group of L4 resources, then the rule will also keep pointers to the group objects 630 in addition to the individual objects. When a policy rule 670 is deleted, each of the objects in these lists has to be notified that the rule has been deleted (otherwise they would have a dangling pointer with the known consequences).

The policy rules 670 include resource access rules 675, NAT rules 680, content rules 685 and security rules 690. The resource access rules 675 use an end point collection object for a-source field and a resource collection object for a resource field. If the end point collection object contains references to user or user group objects the resource access rule 675 will remain inactive as long as none of the users referenced has not logged into the MACSS. When users log in, new filters are installed with the source IP address that the user is logging in from.

The resource access rules 675 are used to control which users have access to what resources. The resource access rules define priority, source, resource, permission level, allowable identifiers, denied identifiers, log type, active time, peer type and peer. The priority assigns a priority to the rule as each new incoming flow is evaluated against each of the policy rules according to their priority. The first rule that matches the flow determines the actions that the MACSS should apply to this new flow. The source as discussed above is a collection of end points (e.g., network, machine) and possibly groups of endpoints (e.g., networks, machines). The end points that apply to the rule are activated (end points are null if not associated with rule). The resource as discussed above is a collection of resources (e.g., L4, URL) or groups of resources (e.g., L4s, URLs). The resources that apply to the rule are activated (resources are null if not associated with rule).

The permission level can have different values depending on whether the resource described in the rule is an L4 resource or a URL resource. In the case of L4 resources, the permission level can be accept, drop (no response back to requester), or deny (negative response is sent back to the requestor). In the case of URL resources, the permission level can be read, write, or execute. Note that these three permission levels can be combined. The allowable identifiers contain a list of requests (e.g., for the URL prefix referenced in the resource field) that will be allowed. The deny identifiers contain a list of requests (e.g., for the URL prefix referenced in the resource field) that will be denied. The log field specifies whether a packet (and possibly subsequent packets from the same flow) that matches a rule should be logged or not. The time field specifies when this rule is active. The peer type specifies the type of peer from which a request should be accepted. The peer specifies the physical or logical interface from which a packet should be received (e.g., ID of the physical interface, IP address of the MACSS).

The NAT rules 680 describe how packets going between private and public address spaces should be translated. The NAT rules 680 define priority, original source, original destination, original service, new source, new destination, new service and NAT mode. The original source and original destination fields utilize end point collections. Note that referencing user or user group objects in the end point collections does not make sense for NAT rules and should not be allowed.

The NAT modes supported by the MACSS include, but are not limited to static destination, Virtual IP or Virtual Internet Protocol (VIP) dynamic NAT/static source, and hide. In the static destination mode the original destination address may be translated to a pre-defined new destination address. In the VIP mode the original destination address and original destination port may be translated to a pre-defined new destination address and new destination port. In the dynamic NAT/static source mode the original source IP address may be replaced by a new source IP address, where the new source IP address may be chosen from a pool of source IP addresses available to the MACSS. Note that the source port may remain unchanged. In the hide mode source IP address and source port may be translated to a new source IP address and new source port. The new source IP address may be the external IP address of the MACSS while the new source port may be dynamically chosen from the list of available source ports.

The content rules 685 specify a filter that is evaluated against the incoming request. If the request clears the filter the action specified in the request is performed. For example, the content rules may be used to express transformations that the MACSS will perform on the requested content (e.g., translate HTTP links to HTTPS links), and to specify what content should be forwarded to external boxes (e.g. for virus scanning). The content rules 685 may define priority, protocol, direction, filter and action. The protocol field provides a name for the protocol used to serve the content covered by this rule (e.g. HTTP). A rule can be applied to different locations associated with a request/response transaction. Accordingly, the direction field specifies at which point a rule should be applied. The direction may be:

- as the request is coming from the client (e.g., removing the referrer header or the user client header in the case of HTTP requests);
- before the request is forwarded to the origin server (e.g., redirecting the request to a different server other than the one assumed by the DNS name);
- after the response is received from the origin server (e.g., virus scanning after the content is received from the server); and
- before the response is sent to the client (e.g., translation of HTTP links to HTTPS links before sending the page back to the client).

The filter field references the name of a content filter element object that already exists in a policy database and the action field defines the local executions that can be performed. The local executions include but are not limited to, EXEC_FORWARD (forward client requests from one MACSS to the other and are created automatically) and EXEC_DROP (implement the signature matching function that is part of application level security).

The security rules 690 may describe how packets matching the source, destination objects should be secured. The security rules 690 may define priority, secure protocol, source, destination, local gateway, remote gateway, key exchange, Diffie-Hellman (DH) group, cipher, (Keyed-) Hash Message Authentication Code (HMAC), life type, life time, security parameters and a log type. The secure protocol field may specify whether the packets should be authenticated using Authentication Header (AH) protocol or encrypted (and authenticated) using Encapsulating Security Payload (ESP) protocol. The source and destination fields may specify the source and destination of the traffic that will be secured. The local and remote gateway fields may specify the IP addresses of the MACSS box that will secure the traffic and the remote peer that will receive the secured traffic (these IP addresses will be used as the source and destination IP address, respectively, of the outer IP packet). The key exchange field specifies how keys are exchanged and determines what key parameters will be used. The life type field may determine how the duration of this IPSEC connection is expressed.

Hardware Architecture

Figure 15:
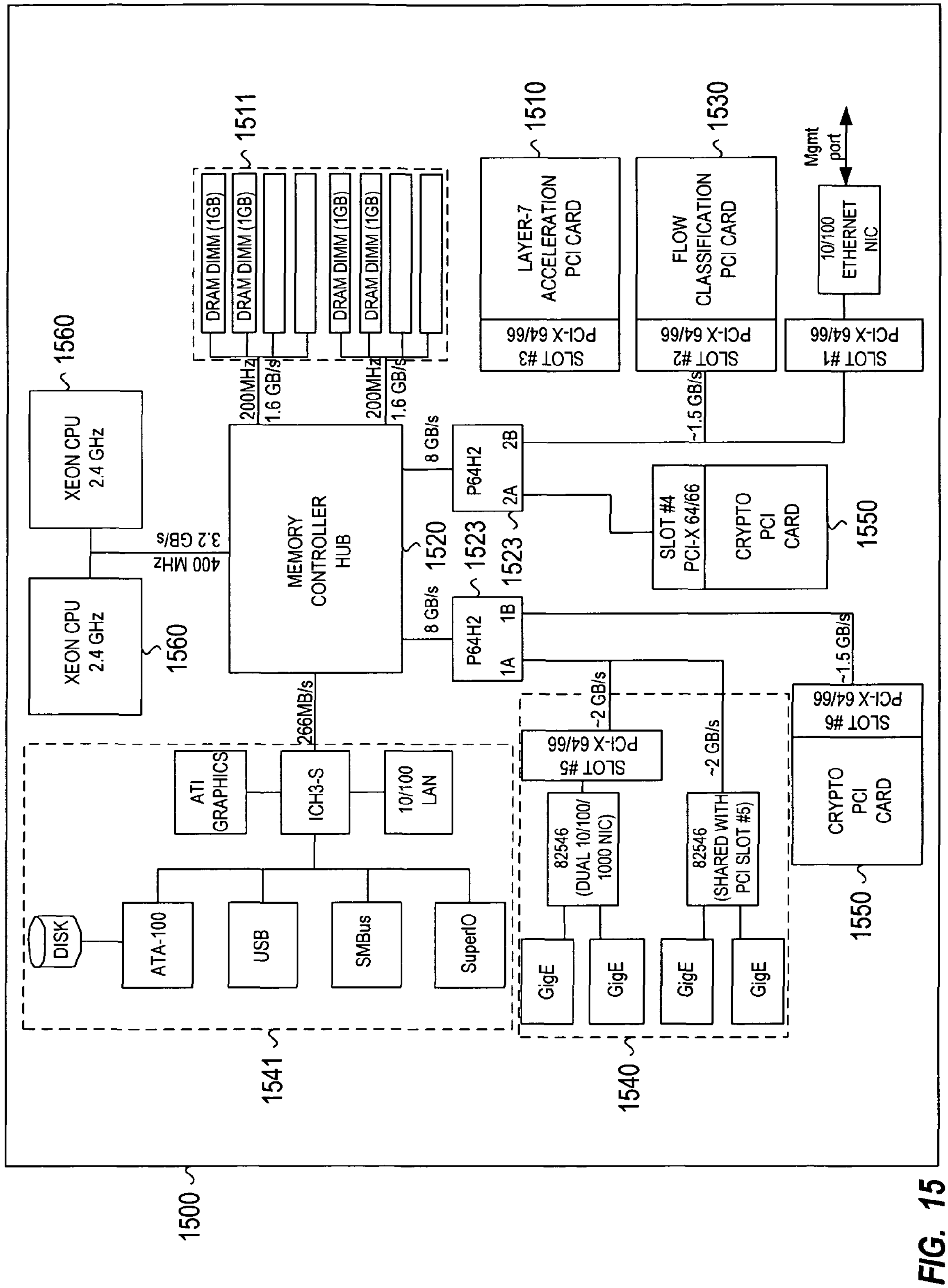
FIG. 15 illustrates an exemplary hardware architecture of the system, according to one embodiment.

FIG. 15 illustrates an exemplary hardware architecture of a motherboard 1500 that can be used to realize the hardware of one embodiment of the invention. The system includes a Layer 7 acceleration card 1510, a memory controller hub 1520, a flow classification PCI card 1530, a network subsystem 1540, Crypto PCI cards 1550, and general-purpose microprocessors 1560. The layer 7 acceleration card 1510 provides higher-level analysis of packets. The memory controller hub 1520 allows for access to memory and communication among the various hardware components. The flow classification card 1530 classifies packets based upon packet header information. The network subsystem 1540 provides a high-speed connection to the network. The Crypto PCI cards 1550 provide acceleration of data encryption and decryption. The general-purpose microprocessors 1560 provide overall system coordination. Additionally, supporting components 1541 provide for a variety of functions and interfaces including Universal Serial Bus (USB) interfaces, 10/100 Local Area Network (LAN) interfaces, ATA-100 disk driver and hard drive (disk) and graphics acceleration through an ATI graphics component. Memory 1511 is connected to memory controller hub 1520 as are PCI bridging function devices 1523.

User Interfaces

Figure 4:
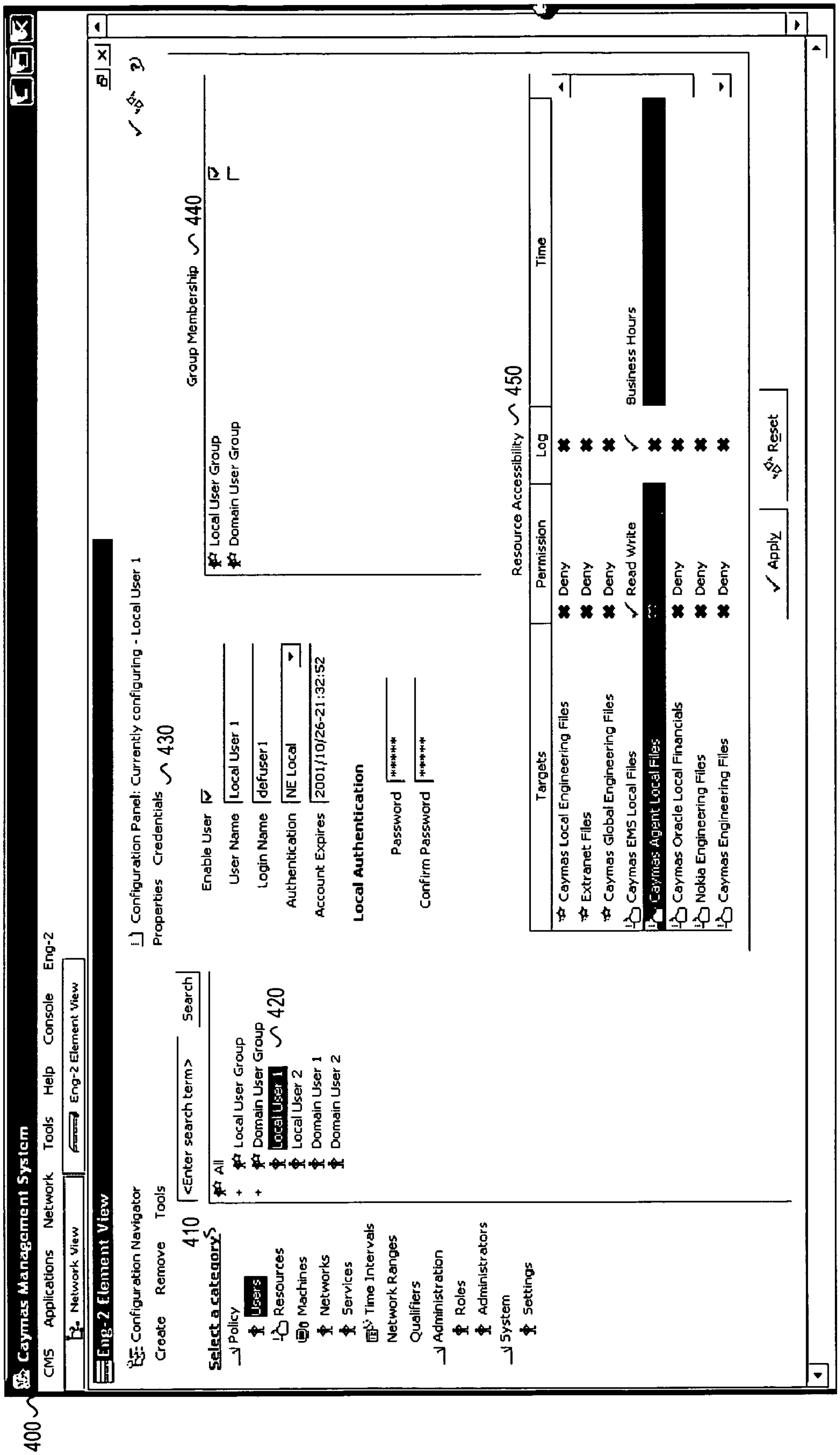
FIG. 4 illustrates an exemplary user interface (UI) for establishment of policy rules within the MACSS, according to one embodiment.

FIG. 4 illustrates an exemplary user interface (UI) 400 for establishment of policy rules within the MACSS. These rules determine the resource and application access provided to users and groups of users. The UI 400 permits a system administrator to create or remove users, assign or remove users from groups, and control access to resources and services. The UI 400 includes an area to select a category (e.g., user, resource) 410, an area to select a subcategory within the category (e.g., specific user with user category) 420, an area to enter user parameters 430, an area to select group data 440, and an area to identify resource accessibility 450.

Figure 5:
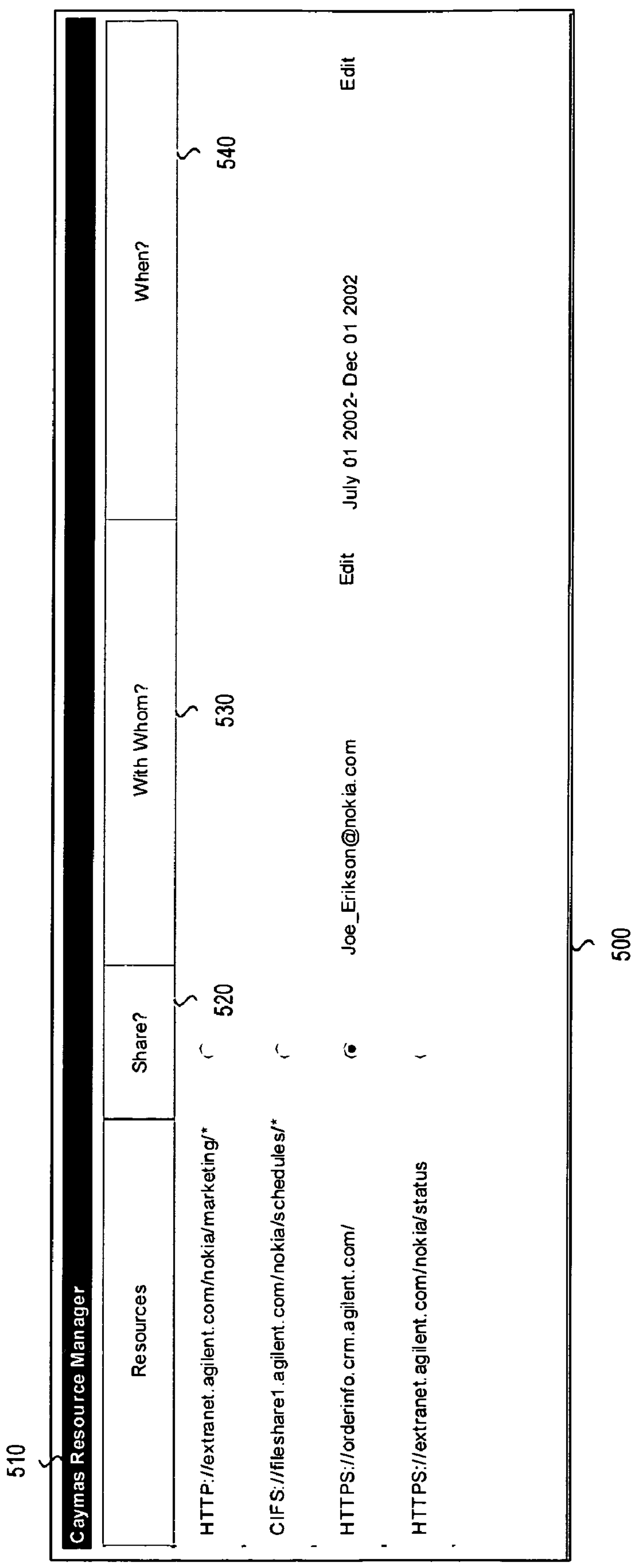
FIG. 5 illustrates an exemplary UI, according to one embodiment.

FIG. 5 illustrates another exemplary user interface 500. The UI 500 contains a list of resources 510. The UI 500 allows an administrator to select whether to share resources 520, identify with whom 530 they will be shared, and identify the time period 540 during which they will be shared. According to one embodiment, a content owner may be allowed to allocate access to content under his ownership. This distributes the workload of access rule creation.

In working with the user interface, an operator may be able to enter a set of human readable access rules that define what resources and services are accessible to that user (or machine). According to one embodiment, these human readable access rules are stored as policy objects. A policy language can be used to define policy objects. Policy objects can include policy components or policy rules that related to those components.

Figure 16:
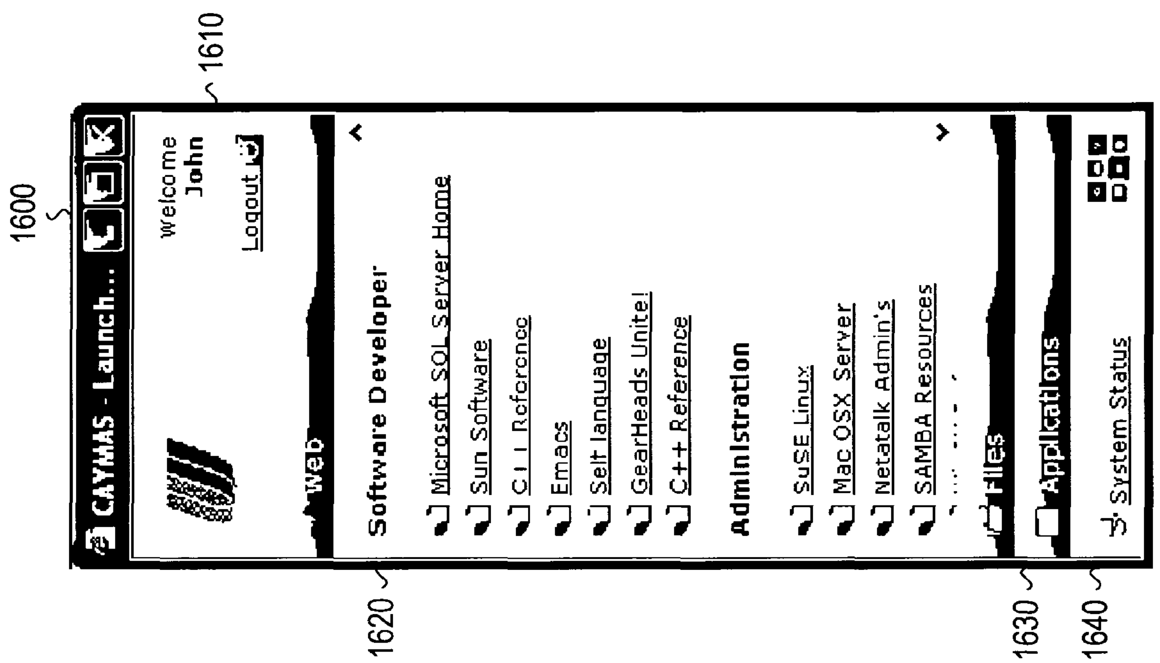
FIG. 16 illustrates an exemplary web-based Launch Pad screen that may be presented to a user once the user is logged in, according to one embodiment.

FIG. 16 illustrates an exemplary web-based Launch Pad screen 1600 that may be presented to a user once the user is logged in. The Launch Pad screen 1600 includes a user section 1610, a web section 1620, a file section 1630 and an applications section 1640. The user section identifies the user and provides a logout option. The web section provides links to web resources specifically made available to that user. As illustrated the resources are divided into software developer and administration resources. The file section 1630 and the applications section 1640 provide links to files and applications respectively, that are specifically made available to that user.

The user logs onto the MACSS 230 which stores the user's authentication and session information, and receives all subsequent requests for services from the user. The HTTP module will automatically prepend the box's hostname to the URL of the resource. When the request is received, the HTTP module will automatically strip off the box's hostname and only requests authorization on the actual resource. The resource object on the MACSS contains the original URL.

Cookie signing is enabled or disabled by configuration information stored in prefix table entries. The settings enable or disable cookie signature checking and generation. The default is to enable cookie signing. When an incoming Cookie is received, a prefix table lookup is performed over the text of its PATH attribute. If cookie signing is enabled for that PATH, a valid signature must appear on that cookie or it will be dropped as an unauthorized cookie because it appears it has been tampered with.

In one embodiment L7 acceleration is utilized within the MACSS to improve overall bandwidth performance. The L7 Accelerator can offload the network processor from performing cycle-intensive character parsing tasks associated with HTTP headers, and can be implemented as an FPGA, ASIC, or other computing platform.

Figure 17:
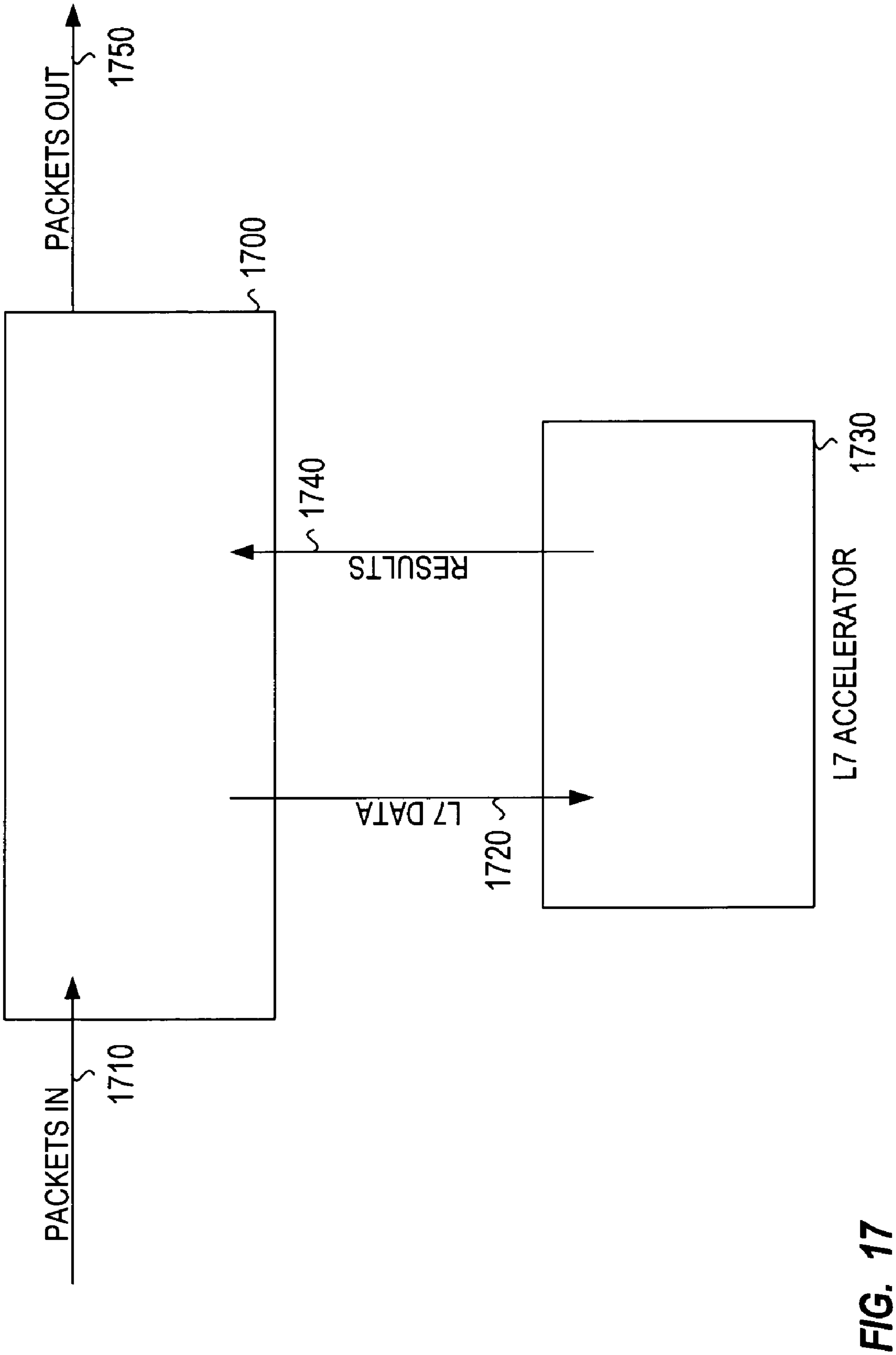
FIG. 17 illustrates an exemplary look-aside configuration of the L7 accelerator relative to the processor, according to one embodiment.

FIG. 17 illustrates an exemplary look-aside configuration of the L7 accelerator relative to a processor. Processor 1700 receives network traffic packets 1710. Level 7 content (e.g., HTTP) 1720 from the incoming packets 1710 is sent to an L7 accelerator 1730. The L7 accelerator 1730 processes the packets and returns the results 1740 to the processor 1700. The processor 1700 then processes the results 1740 to generate the outgoing packets 1750. Processor 1700 may be a general purpose microprocessor, a specialized processor such as a network processor, or other type of computing device capable performing the L7 acceleration function.

A multiple-MACSS solution provides a company with a solution to allow employees and business partners secure and authorized access of L7 and L4 resources. This section explains how the MACSSs are deployed, how the policy rules are employed to allow content access and how the system is designed by presenting actual use case scenarios.

Figure 18:
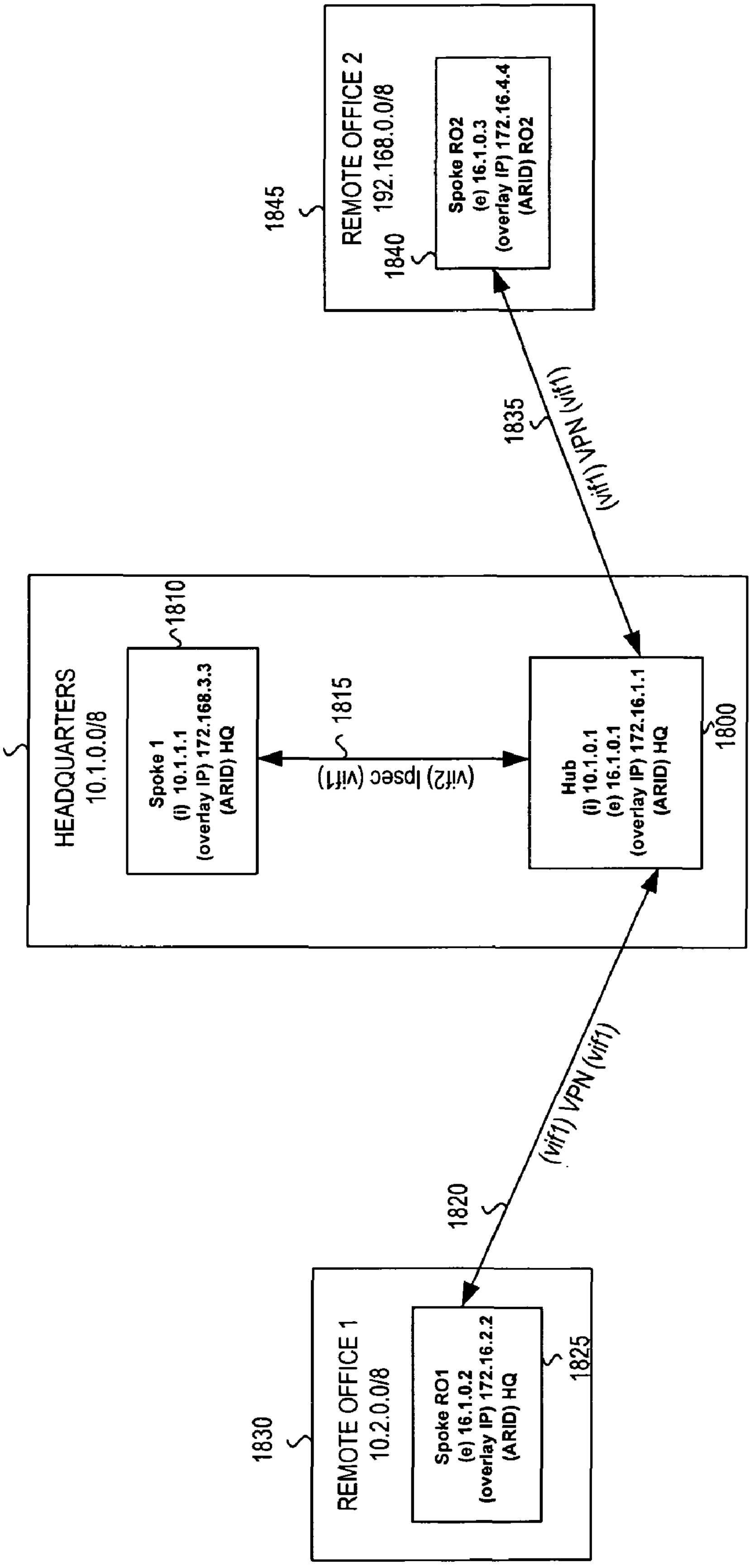
FIG. 18 illustrates an exemplary hub-and-spoke configuration, according to one embodiment.

FIG. 18 illustrates an exemplary hub-and-spoke configuration. A hub MACSS 1800 may be established at a particular location (e.g., headquarters) 1805. The hub MACSS 1800 may be connected to a spoke MACSS 1810 within the location 1805 via an IPSec connection 1815. Additionally, the hub MACSS 1800 may be connected via a virtual private network (VPN) 1820 to a spoke MACSS 1825 at a first remote office 1830, and via another VPN connection 1835 to another spoke MACSS 1840 at a second remote office 1845. In a multi-MACSS system, content from one area of the network may be cached on a MACSS in another area of the network to reduce overall network traffic.

On every box there may be a topology manager component, which maintains information about the boxes in the system. The topology manager interfaces with an underlying module responsible for maintaining the health status of connections through period keep-alive messages. The underlying connection health module alerts the topology manager if a connection dies.

In one embodiment the topology manager on every box in the system has an entry for every other box in the system. Every entry in the hub's topology map may be reachable and connected since all spokes are connected to the hub. In this embodiment the topology manager maintains for each box a scope ID, a box IP address, an overlay IP address, and a reachability determination. The topology manager automatically determines reachability from the other information regarding the box before entering the box information into the map. However, the topology is not fully established until the spoke is properly configured. The spoke control information is sent down to the spoke after the one-time key is accepted and before any other policy information is exchanged. The spoke will then auto-generate all the policy objects and rules it needs in order to establish a secure channel with the hub.

Computer program instructions to implement a software embodiment of the present invention may be stored in a computer program memory or on a computer readable carrier such as a disk, memory stick, portable memory device, communications signal or carrier wave. The instruments may be carried out in any computer programming language.

The many features and advantages of the invention are apparent from the detailed specification. Since numerous modifications and variations will readily occur to those skilled in the art, it is not desired to limit the invention to the exact construction and operation illustrated and described. Accordingly, all appropriate modifications and equivalents may be included within the scope of the invention.

What is claimed is:

1. A method for more efficiently controlling access to a computer system through a network device having a plurality of security system sublayers, a first security system sublayer of the network device controlling access of a user prior to a second security system sublayer of the network device controlling access of the user, the method comprising:

receiving, by a network device, user identification information corresponding to a user;

retrieving, by the network device, a set of access policies corresponding to the user, the access policies configured via a policy language;

generating, by the network device responsive to authenticating the user, at least one access rule specific to the user for each of a plurality of security system sublayers based on the set of access policies corresponding to the user, each of the plurality of security system sublayers operating at different layers of network communications;

installing, by the network device, a user specific filter on each of the plurality of security system sublayers of the network device, the user specific filter automatically converted from the at least one generated access rule for the user for each of the plurality of security system sublayers;

receiving, by the network device, from the user, a request to access a computer system resource;

determining, by the network device, the user is not permitted to access at least a portion of the computer system resource based on the user identification information and a first user specific filter of the user of a first plurality of user specific filters of a first security system sublayer of the plurality of security system sublayers; and dropping, by the network device, the request prior to a second user specific filter of the user of a second plurality of user specific filters of a second security system sublayer of the network device processing the request.

2. The method of claim 1, wherein the requested computer system resource is associated with at least one of the plurality of security system sublayers, and the determining step is also based on the at least one sublayer with which the resource is associated.

3. The method of claim 1, wherein:

the generating also includes retrieving data corresponding to a set of human readable access policies and the at least one access rule for each of the plurality of security system sublayers is based on the human readable access policies; and the human readable access policies have been entered by a human operator.

4. The method of claim 1, wherein the generating further comprises replacing the at least one generated access rule with at least one replacement access rule if the at least one generated access rule conflicts with a previously generated at least one access rule.

5. The method of claim 1, wherein the generating is further based on one or more groups with which the user is associated.

6. The method of claim 1, wherein the plurality of security system sublayers includes a firewall layer and a transport layer.

7. The method of claim 6, wherein at least one user specific filter of the user generated for the firewall layer includes at least one of a port user specific filter of the user, a packet authentication user specific filter of the user and a NAT translation user specific filter of the user.

8. The method of claim 1, wherein the plurality of security system sublayers includes an application layer.

9. The method of claim 1, further comprising removing the installed user specific filter from the sublayers when the user logs out.

10. The method of claim 1, further comprising removing the installed user specific filter from the sublayers when the session for the user ends.

11. The method of claim 1, comprising determining, by the network device, if the user is permitted to access at least a portion of the computer system resource based on the user identification information and a third user specific filter of the user of a third plurality of user specific filters of a third security system sublayer of the plurality of security system sublayers, the third security system sublayer processing the request prior to the first user specific filter of the user of the first plurality of user specific filters of the first security system sublayer.

12. The method of claim 1 further comprising each sublayer of the plurality of security system sublayers providing access control to a predetermined layer of network stack of the device.

13. The method of claim 1, further comprising installing the user specific filter on the first security system sublayer responsive to the determination that the first user specific filter was not installed on the first security system sublayer.

14. The method of claim 1, further comprising not installing the user specific filter on the first security system sublayer responsive to the determination that the user specific filter was installed on the first security system sublayer.

15. A non-transitory computer readable medium having program instructions stored thereon that instruct a network device comprising a plurality of security system sublayers to more efficiently control access by a user to a computer system via the network device, a first security system sublayer of the network device controlling access of a user prior to a second security system sublayer of the network device controlling access of the user, wherein the instructions comprise instructions to:

receive, by a network device, user identification information corresponding to a user;

retrieve, by the network device, a set of access policies corresponding to the user, the access policies configured via a policy language;

generate, by the network device responsive to authenticating the user, at least one-access rule specific to the user for each of a plurality of security system sublayers based on the set of access policies corresponding to the user, each of the plurality of security system sublayers operating at different layers of network communications;

install, by the network device, a user specific filter on each of the plurality of security system sublayers of the network device, the user specific filter automatically converted from at least one generated access rule for the user for each of the plurality of security system sublayers;

determine, by the network device, whether the user is not permitted to access at least a portion of the computer system resource based on the user identification information and a first user specific filter of the user of a first plurality of user specific filters of a first security system sublayer of the plurality of security system sublayers; and drop, by the network device, the request prior to a second user specific filter of the user of a second plurality of user specific filters of a second security system sublayer of the network device processes the request.

16. The computer readable medium of claim 15, wherein the requested computer system resource is associated with at least one of the plurality of security system sublayers, and the determining step is also based on the at least one sublayer with which the resource is associated.

17. The computer readable medium of claim 15, wherein the instructions further instruct the network device to, in the generating step, retrieve data corresponding to a set of human readable access policies, wherein the human readable access policies have been entered by a human operator; and wherein the generating step is further based on the human readable access policies.

18. The computer readable medium of claim 15, wherein the plurality of security system sublayers includes a firewall layer and a transport layer.

19. The computer readable medium of claim 15 wherein the network device determines if the user is permitted to access at least a portion of the computer system resource based on the user identification information and a third user specific filter of the user of a third plurality of user specific filters of a third security sublayer of the plurality of security system sublayers, the third security system sublayer processing the request prior to the first user specific filter of the user of the first plurality of user specific filters of the first security system sublayer.

20. The computer readable medium of claim 15 wherein each sublayer of the plurality of security system sublayers provides access control to a predetermined layer of network stack of the device.

21. A computer system with a plurality of security system sublayers, the system comprising:

a network device comprising a processor;

means of a network device for receiving user identification information corresponding to a user;

means of the network device for retrieving a set of access policies corresponding to the user, the access policies configured via a policy language;

means of the network device, for generating, responsive to authenticating the user, at least one access rule specific to the user for each of a plurality of security system sublayers based on the set of access policies corresponding to the user, each of the plurality of security system sublayers operating at different layers of network communications;

means of the network device for installing a user specific filter on each of the plurality of security system sublayers of the network device, the user specific filter automatically converted from the at least one generated access rule for the user for each of the plurality of security system sublayers;

means of the network device, for receiving from the user a request to access a computer system resource;

means of the network device for determining the user is not permitted to access at least a portion of a the computer system resource based on the user identification information and a first user specific filter of a first plurality of user specific filters of a first security system sublayer of the plurality of security system sublayers; and means of the network device for dropping the request prior to a second user specific filter of a second plurality of user specific filters of a second security system sublayer of the network device processing the request.

22. A method of providing secure, configurable access to a computer system through a network device comprising a plurality of security system sublayers, the method comprising:

generating, by a network device, for a user, responsive to authenticating the user, at least one access rule specific to the user for each of a plurality of security system sublayers based on a set of retrieved access policies corresponding to the user and configured via a policy language, wherein the sublayers correspond to a hierarchy of complexity;

installing, by the network device, on each of the plurality of security system sublayers of the network device a user specific filter, the user specific filter automatically converted from the at least one generated access rule for the user for each of the plurality of security system sublayers, each of the plurality of security system sublayers operating at different layers of network communications;

distributing at least one of the generated access rules to at least one of the plurality of security system sublayers;

receiving, from the user, a request to access a computer system resource; and determining whether the user is not permitted to access at least a portion of a computer system resource based on the user identification information and a first user specific filter of the user of a first plurality of user specific filters of a first security system sublayer of the plurality of security system sublayers; and dropping, by the network device, the request prior to a second user specific filter of the user of a second plurality of user specific filters of a second security system sublayer of the network device processing the request.

23. The method of claim 22, wherein the requested computer system resource is associated with at least one of the plurality of security system sublayers, and the determining step is also based on the at least one sublayer with which the resource is associated.

24. The method of claim 22, wherein said generating includes retrieving data corresponding to a set of human readable access policies, wherein the human readable access policies have been entered by a human operator, and wherein each access rule is further based on the human readable access policies.

25. The method of claim 22, wherein said generating includes replacing the generated access rule with a replacement rule if the generated access rule conflicts with a previously generated access rule.

26. The method of claim 22, wherein said generating is also based on one or more groups with which the user is associated.

27. The method of claim 22, wherein the plurality of security system sublayers includes a firewall layer and a transport layer.

* * * * *